(12) United States Patent
Yao et al.

(10) Patent No.: US 11,750,515 B2
(45) Date of Patent: Sep. 5, 2023

(54) DATA TRANSMISSION METHOD AND APPARATUS

(71) Applicant: Huawei Technologies Co., Ltd., Shenzhen (CN)

(72) Inventors: Junda Yao, Beijing (CN); Zhibo Hu, Beijing (CN); Jianbin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 299 days.

(21) Appl. No.: 17/237,635

(22) Filed: Apr. 22, 2021

(65) Prior Publication Data

US 2021/0250292 A1 Aug. 12, 2021

Related U.S. Application Data

(63) Continuation of application No. PCT/CN2019/109601, filed on Sep. 30, 2019.

(30) Foreign Application Priority Data

Oct. 23, 2018 (CN) .......................... 201811246093.0

(51) Int. Cl.
*H04L 12/741* (2013.01)
*H04L 45/74* (2022.01)
*H04L 12/46* (2006.01)

(52) U.S. Cl.
CPC .......... *H04L 45/74* (2013.01); *H04L 12/4633* (2013.01); *H04L 12/4641* (2013.01)

(58) Field of Classification Search
CPC . H04L 45/04; H04L 12/4633; H04L 12/4641; H04L 45/34; H04L 45/74; H04L 47/125
See application file for complete search history.

(56) References Cited

U.S. PATENT DOCUMENTS

2008/0170578 A1 7/2008 Ould-Brahim
2015/0304206 A1 10/2015 Filsfils et al.
(Continued)

FOREIGN PATENT DOCUMENTS

CN 102195844 A 9/2011
CN 102938734 A 2/2013
(Continued)

OTHER PUBLICATIONS

Filsfils, C. et al., "SRv6 Network Programming; draft-filsfils-spring-srv6-network-programming-06", Internet-draft, Oct. 22, 2018, 55 pages.
(Continued)

*Primary Examiner* — Mansour Oveissi
(74) *Attorney, Agent, or Firm* — Slater Matsil, LLP

(57) ABSTRACT

Embodiments of this application provide a data transmission method and apparatus. The method includes receiving, by a first device, a data packet, and extracting first address information of the data packet, where the first address information indicates a VNF; retrieving, by the first device based on the first address information, an SRv6 tunnel policy that corresponds to the first address information and that is from a SRv6 tunnel list; obtaining, by the first device, a forwarding path corresponding to a first SRv6 VPN SID, where the forwarding path is used as a data transmission path when the first device communicates with a second device corresponding to the first SRv6 VPN SID; and forwarding, by the first device, the data packet to the VNF based on the forwarding path.

20 Claims, 13 Drawing Sheets

(56) References Cited

U.S. PATENT DOCUMENTS

| | | | |
|---|---|---|---|
| 2017/0149685 A1 | 5/2017 | Wu et al. | |
| 2018/0109450 A1 | 4/2018 | Filsfils et al. | |
| 2018/0375763 A1* | 12/2018 | Brissette | H04L 49/35 |
| 2019/0104048 A1* | 4/2019 | Nainar | G06F 11/302 |
| 2021/0083973 A1* | 3/2021 | Peng | H04L 45/02 |

FOREIGN PATENT DOCUMENTS

| | | |
|---|---|---|
| CN | 103297338 A | 9/2013 |
| CN | 105049350 A | 11/2015 |
| CN | 106878168 A | 6/2017 |
| CN | 106992917 A | 7/2017 |
| CN | 107248941 A | 10/2017 |
| CN | 107959611 A | 4/2018 |
| WO | 2014139462 A1 | 9/2014 |

OTHER PUBLICATIONS

Cisco Systems, "Packet Processing Description of SRv6", 3GPP TSG CT WG4 Meeting #86, C4-186167, West Palm Beach, FL, US, Aug. 20-24, 2018, 2 pages.

* cited by examiner

DATA TRANSMISSION METHOD AND APPARATUS

CROSS-REFERENCE TO RELATED APPLICATIONS

This application is a continuation of International Application No. PCT/CN2019/109601, filed on Sep. 30, 2019, which claims priority to Chinese Patent Application No. 201811246093.0, filed on Oct. 23, 2018. The disclosures of the aforementioned applications are hereby incorporated by reference in their entireties.

TECHNICAL FIELD

Embodiments of this application relate to the communications field, and in particular, to a data transmission method and apparatus.

BACKGROUND

When nodes in an existing metropolitan area network communicate with each other, for example, a multi-protocol label switching (MPLS) communications protocol is used, nodes in a data center network (DCN) network communicate with each other by using a virtual extensible local area network (VXLAN) protocol. In other words, two networks are independent of each other. Therefore, when the two networks need to exchange data, the metropolitan area network needs to converge data messages to a border node of the metropolitan area network, and the DCN needs to converge the data messages to a border node of the DCN network, and then protocol conversion is performed through the two border nodes, so as to complete data intercommunication. To be specific, an MPLS tunnel on the metropolitan area network and a VXLAN tunnel on the DCN network are concatenated through the border nodes on the networks.

It is clear that, in a conventional technology, because the metropolitan area network and the DCN network are independent of each other, network transmission processes in the metropolitan area network and the DCN are complex, and management is difficult.

SUMMARY

This application provides a data transmission method and apparatus, to implement end-to-end connectivity between different networks, that is, devices in the different networks may transmit data packets through a tunnel.

To achieve the foregoing objectives, the following technical solutions are used in this application.

According to a first aspect, an embodiment of this application provides a data transmission method. The method is applied to a communications system, and the communications system includes a first device, a second device, and a virtualized network function VNF. The VNF includes a plurality of virtual machines VMs. The first device is located in a first network, the second device is located in a second network, and the plurality of VMs communicate with the first device by using the second device. The method may include: The first device receives a data packet, and extracts first address information of the data packet. The first address information is used to indicate the virtualized network function VNF. Then, the first device may retrieve, based on the first address information, an SRv6 tunnel policy that corresponds to the first address information and that is from an IPv6 segment routing SRv6 tunnel list. The SRv6 tunnel policy is used to indicate an SRv6 tunnel between the first device and the second device, and the SRv6 tunnel policy includes a first SRv6 virtual private network segment identifier VPN SID. Then, the first device obtains a forwarding path corresponding to the first SRv6 VPN SID. The forwarding path is used as a data transmission path when the first device communicates with a second device corresponding to the first SRv6 VPN SID. The first device forwards the data packet to the VNF based on the forwarding path by using the second device.

According to the foregoing method, the SRv6 tunnel between the first network and the second network is established, so that the first device and the second device can transmit data through the SRv6 tunnel, and the data packet is forwarded to the VNF by using the second device, thereby implementing communication between the first device and the VNF, that is, end-to-end communication between the first network and a cloud. This effectively decreases complexity and management difficulty during data transmission.

In a possible implementation, the first network may be a metropolitan area network and the second network may be a data center network DCN.

According to the foregoing method, end-to-end transmission between the metropolitan area network and the DCN network is implemented.

In a possible implementation, the method may further include: The first device receives a first routing message sent by the second device. The first routing message carries the first SRv6 VPN SID and the first address information. The first SRv6 VPN SID is generated by the second device based on a second routing message that is advertised by the VNF and that carries second address information. The second address information is used to indicate a first VM in the plurality of VMs. The first device detects whether the SRv6 tunnel policy corresponding to the first address information exists in the SRv6 tunnel list. If the SRv6 tunnel policy corresponding to the first address information exists, the first device adds the first SRv6 VPN SID to the SRv6 tunnel policy. If no SRv6 tunnel policy corresponding to the first address information exists, the first device generates the SRv6 tunnel policy, associates the SRv6 tunnel policy with the first address information, and adds the first SRv6 VPN SID to the SRv6 tunnel policy.

According to the foregoing method, the SRv6 tunnel between the first device located in the first network and the second device located in the second network is established, so that the first device and the second device can communicate with each other through the SRv6 tunnel, to implement an end-to-end connection.

In a possible implementation, the method may further include: If the first device receives a new SRv6 VPN SID sent by a third device located in the second network, the first device adds the new SRv6 VPN SID to the SRv6 tunnel policy. The new SRv6 VPN SID is generated by the third device based on a received third routing message that is advertised by the VNF and that carries third address information of the first VM after the first VM is switched to the third device. The third address information is the same as or different from the second address information.

According to the foregoing method, the first device can timely update an end-to-end tunnel according to a change of the second network and a change of the cloud, thereby effectively improving timeliness of system management.

In a possible implementation, the method may further include: If the first device detects that the SRv6 tunnel policy corresponding to the first address information exists, the first device detects whether the forwarding path corresponding to the first SRv6 VPN SID exists in a local forwarding table. If the forwarding path corresponding to the SRv6 VPN SID exists, the first device adds the forwarding path including the first SRv6 VPN SID to the SRv6 tunnel policy. If no forwarding path corresponding to the SRv6 VPN SID exists, the first device obtains the forwarding path from a controller side, and adds the forwarding path including the first SRv6 VPN SID to the SRv6 tunnel policy. If the first device does not detect the SRv6 tunnel policy corresponding to the first address information, the first device generates the SRv6 tunnel policy, and associates the SRv6 tunnel policy with the first address information. The first device detects whether the forwarding path corresponding to the first SRv6 VPN SID exists in a local forwarding table. If the forwarding path corresponding to the first SRv6 VPN SID exists, the first device adds the forwarding path including the first SRv6 VPN SID to the SRv6 tunnel policy. If no forwarding path corresponding to the first SRv6 VPN SID exists, the first device obtains the forwarding path from a controller side, and adds the forwarding path including the first SRv6 VPN SID to the SRv6 tunnel policy.

According to the foregoing manner, the SRv6 tunnel between the first device located in the first network and the second device located in the second network is established, so that the first device and the second device can communicate with each other through the SRv6 tunnel, to implement an end-to-end connection.

In a possible implementation, the SRv6 tunnel policy further includes a weight value corresponding to the first SRv6 VPN SID, and the weight value is used to indicate that the first device allocates, based on the weight value, the data packet to the forwarding path corresponding to the first SRv6 VPN SID.

According to the foregoing method, load sharing based on a plurality of SRv6 tunnels established between the first device and the second device is implemented, and a load sharing rule may be dynamically configured, to improve system resource utilization.

According to a second aspect, an embodiment of this application provides a data transmission method. The method is applied to a communications system, and the communications system includes a first device, a border device, a second device, and a virtualized network function VNF. The VNF includes a plurality of virtual machines VMs. The first device is located in a first network, the second device is located in a second network, the border device is a border node between the first network and the second network, and the plurality of VMs communicate with the first device by using the second device. The method may further include: The border device receives a data packet sent by the first device through a first IPv6 segment routing SRv6 tunnel. The first SRv6 tunnel is used to establish a communication connection between the first device and the border device. The data packet carries a first SRv6 segment identifier SID. Then, the border device retrieves, based on the first SRv6 VPN SID, an SRv6 tunnel policy that corresponds to the first SRv6 VPN SID and that is from an SRv6 tunnel list. The SRv6 tunnel policy indicates a second SRv6 tunnel between the border device and the second device, and the SRv6 tunnel policy includes a second SRv6 VPN SID. The border device obtains a forwarding path corresponding to the second SRv6 VPN SID. The forwarding path is used as a data transmission path when the border device communicates with the second device. The border device forwards the data packet to the VNF based on the forwarding path by using the second device.

According to the foregoing method, the SRv6 tunnel between the first device in the first network and the second device in the second network is established, that is, the first SRv6 tunnel established in the first network and the second SRv6 tunnel established in the second network are concatenated by using the border device, thereby implementing communication between the first device and the VNF, that is, end-to-end communication between the first network and the cloud. This effectively decreases complexity and management difficulty during data transmission.

In a possible implementation, the first network may be a metropolitan area network and the second network may be a data center network DCN.

According to the foregoing method, end-to-end transmission between the metropolitan area network and the DCN network is implemented.

In a possible implementation, the method may further include: The border device receives a first routing message sent by the second device. The first routing message carries the second SRv6 VPN SID and first address information. The second SRv6 VPN SID is generated by the second device based on a second routing message that is advertised by the VNF and that carries second address information. The second address information is used to indicate a VM in the VNF. The border device detects whether an SRv6 tunnel policy corresponding to the first address information exists. If the SRv6 tunnel policy corresponding to the first address information exists, the border device adds the second SRv6 VPN SID to the SRv6 tunnel policy. If no SRv6 tunnel policy corresponding to the first address information exists, the border device generates the SRv6 tunnel policy, associates the SRv6 tunnel policy with the first address information, and adds the second SRv6 VPN SID to the SRv6 tunnel policy.

According to the foregoing method, the SRv6 tunnel between the border device and the second device located in the second network is established, so that the border device and the second device can communicate with each other through the SRv6 tunnel, to implement an end-to-end connection.

In a possible implementation, the method may further include: if a new SRv6 VPN SID sent by a third device located in the second network is received, the border device adds the new SRv6 VPN SID to the SRv6 tunnel policy. The new SRv6 VPN SID is generated by the third device based on a received third routing message that is advertised by the VNF and that carries third address information of the first VM after the first VM is switched to the third device. The third address information is the same as or different from the second address information.

According to the foregoing method, the border device can timely update an end-to-end tunnel according to a change of the second network and a change of the cloud, thereby effectively improving timeliness of system management. In addition, because the tunnel is updated only at the border device side, the first device side does not perceive a change of the second network and the VNF end, so that load pressure at the first device side is reduced, and resource utilization is further improved.

In a possible implementation, the method may further include: If the border device detects that the SRv6 tunnel policy corresponding to the first address information exists, the border device detects whether the forwarding path corresponding to the second SRv6 VPN SID exists in a local forwarding table. If the forwarding path corresponding to the second SRv6 VPN SID exists, the border device adds the forwarding path including the second SRv6 VPN SID to the SRv6 tunnel policy. If no forwarding path corresponding to the second SRv6 VPN SID exists, the border device obtains the forwarding path from a controller side, and adds the forwarding path including the second SRv6 VPN SID to the SRv6 tunnel policy. If the border device does not detect the SRv6 tunnel policy corresponding to the first address information, the border device generates the SRv6 tunnel policy, and associates the SRv6 tunnel policy with the first address information. The border device detects whether the forwarding path corresponding to the second SRv6 VPN SID exists in a local forwarding table. If the forwarding path corresponding to the second SRv6 VPN SID exists, the border device adds the forwarding path including the second SRv6 VPN SID to the SRv6 tunnel policy. If no forwarding path corresponding to the second SRv6 VPN SID exists, the border device obtains the forwarding path from a controller side, and adds the forwarding path including the second SRv6 VPN SID to the SRv6 tunnel policy.

According to the foregoing method, the SRv6 tunnel between the border device and the second device located in the second network is established, so that the border device and the second device can communicate with each other through the SRv6 tunnel, to implement an end-to-end connection.

In a possible implementation, the SRv6 tunnel policy further includes a weight value corresponding to the second SRv6 VPN SID, and the weight value is used to indicate that the border device allocates, based on the weight value, the data packet to the forwarding path corresponding to the second SRv6 VPN SID.

According to the foregoing method, load sharing based on a plurality of SRv6 tunnels established between the border device and the second device is implemented, and a load sharing rule may be dynamically configured, to improve system resource utilization.

According to a third aspect, an embodiment of this application provides a data transmission method. The method is applied to a communications system, and the communications system includes a first device, a second device, and a virtualized network function VNF. The first device is located in a first network, the second device is located in a second network, and the VNF includes a plurality of virtual machines VMs. The VMs communicate with the first device by using the second device. The method includes: The first device receives a first routing message sent by the second device. The first routing message carries a first IPv6 segment routing segment identifier SRv6 VPN SID and first address information. The first SRv6 VPN SID is generated by the second device based on a second routing message that is sent by a first VM in the plurality of VMs and that carries second address information. The first address information is used to indicate the VNF, and the second address information is used to indicate the first VM. The first device obtains a forwarding path corresponding to the first SRv6 VPN SID. The forwarding path is used to indicate a data transmission path when the first device communicates with the second device. The first device obtains an SRv6 tunnel based on the forwarding path. If the first device receives a data packet carrying the first address information, the first device forwards the data packet to the VNF based on the SRv6 tunnel by using the second device.

In a possible implementation, the step of obtaining the SRv6 tunnel by the first device includes: detecting whether an SRv6 tunnel policy corresponding to the first address information exists in an SRv6 tunnel list, where the SRv6 tunnel policy is used to indicate the SRv6 tunnel; and if the SRv6 tunnel policy corresponding to the first address information exists, adding the forwarding path including the first SRv6 VPN SID to the SRv6 tunnel policy, or if no SRv6 tunnel policy corresponding to the first address information exists, generating the SRv6 tunnel policy, associating the SRv6 tunnel policy with the first address information, and adding the forwarding path including the first SRv6 VPN SID to the SRv6 tunnel policy.

In a possible implementation, the first network may be a metropolitan area network and the second network may be a data center network DCN.

In a possible implementation, the first routing message may further carry a weight value corresponding to the first SRv6 VPN SID, and the weight value is used to indicate that the first device allocates, based on the weight value, the data packet to the forwarding path corresponding to the first SRv6 VPN SID.

In a possible implementation, the method may further include: if a new SRv6 VPN SID sent by a third device located in the second network is received, adding the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

According to a fourth aspect, an embodiment of this application provides a data transmission method. The method is applied to a communications system. The communications system includes a first device, a border device, a second device, and a virtualized network function VNF. The VNF includes a plurality of virtual machines VMs. The first device is located in a first network, the second device is located in a second network, the border device is a border node between the first network and the second network, and the plurality of VMs communicate with the first device by using the second device. The method includes: The border device receives a first routing message sent by the second device. The first routing message carries a first IPv6 segment routing segment identifier SRv6 VPN SID and first address information. The first SRv6 VPN SID is generated by the second device based on a second routing message that is sent by a first VM in the plurality of VMs and that carries second address information. The first address information is used to indicate the VNF, and the second address information is used to indicate the first VM. The border device obtains a forwarding path corresponding to the first SRv6 VPN SID. The forwarding path is used to indicate a data transmission path when the border device communicates with the second device. The border device obtains a first SRv6 tunnel based on the forwarding path. The border device generates a second SRv6 VPN SID, and associating the second SRv6 VPN SID with the first SRv6 tunnel. The border device sends the second SRv6 VPN SID to the first device, so that the first device obtains a second SRv6 tunnel between the first device and the border device based on the second SRv6 VPN SID. If the border device receives a data packet that is sent by the first device and that carries the second SRv6 VPN SID, the border device forwards the data packet to the VNF based on the first SRv6 tunnel by using the second device.

In a possible implementation, the step of obtaining the SRv6 tunnel by the border device may include: detecting whether an SRv6 tunnel policy corresponding to the first address information exists in an SRv6 tunnel list, where the SRv6 tunnel policy is used to indicate the first SRv6 tunnel; and if the SRv6 tunnel policy corresponding to the first address information exists, adding the forwarding path including the first SRv6 VPN SID to the SRv6 tunnel policy; or if no SRv6 tunnel policy corresponding to the first address information exists, generating the SRv6 tunnel policy, associating the SRv6 tunnel policy with the first address information, and adding the forwarding path including the first SRv6 VPN SID to the SRv6 tunnel policy.

In a possible implementation, the first network may be a metropolitan area network and the second network may be a data center network DCN.

In a possible implementation, the first routing message may further carry a weight value corresponding to the first SRv6 VPN SID, and the weight value is used to indicate that the border device allocates, based on the weight value, the data packet to the forwarding path corresponding to the first SRv6 VPN SID.

In a possible implementation, the method may further include: if a new SRv6 VPN SID sent by a third device located in the second network is received, adding the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

According to a fifth aspect, an embodiment of this application provides a first device. The first device is used in a communications system. The communications system further includes a border device, a second device, and a virtualized network function VNF. The VNF includes a plurality of virtual machines VMs. The first device is located in a first network, the second device is located in a second network, the border device is a border node between the first network and the second network, and the plurality of VMs communicate with the first device by using the second device. The first device includes: a memory, and a processor that is communicatively connected to the memory. The processor is configured to: receive a data packet, and extract first address information of the data packet, where the first address information is used to indicate the virtualized network function VNF; retrieve, based on the first address information, an SRv6 tunnel policy that corresponds to the first address information and that is from an IPv6 segment routing SRv6 tunnel list, where the SRv6 tunnel policy is used to indicate an SRv6 tunnel between the first device and the second device, and the SRv6 tunnel policy includes a first SRv6 virtual private network segment identifier VPN SID; obtain a forwarding path corresponding to the first SRv6 VPN SID, where the forwarding path is used as a data transmission path when the first device communicates with a second device corresponding to the first SRv6 VPN SID; and forward the data packet to the VNF based on the forwarding path by using the second device.

In a possible implementation, the first network may be a metropolitan area network and the second network may be a data center network DCN.

In a possible implementation, the processor is further configured to: receive a first routing message sent by the second device, where the first routing message carries the first SRv6 VPN SID and the first address information, the first SRv6 VPN SID is generated by the second device based on a second routing message that is advertised by the VNF and that carries second address information, and the second address information is used to indicate a first VM in the plurality of VMs; detect whether the SRv6 tunnel policy corresponding to the first address information exists in the SRv6 tunnel list; and if the SRv6 tunnel policy corresponding to the first address information exists, add the first SRv6 VPN SID to the SRv6 tunnel policy; or if no SRv6 tunnel policy corresponding to the first address information exists, generate the SRv6 tunnel policy, associate the SRv6 tunnel policy with the first address information, and add the first SRv6 VPN SID to the SRv6 tunnel policy.

In a possible implementation, the processor is further configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

In a possible implementation, the processor is further configured to: if the SRv6 tunnel policy corresponding to the first address information is detected, detect whether the forwarding path corresponding to the first SRv6 VPN SID exists in a local forwarding table; and if the forwarding path corresponding to the SRv6 VPN SID exists, add the forwarding path including the first SRv6 VPN SID to the SRv6 tunnel policy; or if no forwarding path corresponding to the SRv6 VPN SID exists, obtain the forwarding path from a controller side, and add the forwarding path including the first SRv6 VPN SID to the SRv6 tunnel policy; if the SRv6 tunnel policy corresponding to the first address information is not detected, generate the SRv6 tunnel policy, associate the SRv6 tunnel policy with the first address information, and detect, by the first device, whether the forwarding path corresponding to the first SRv6 VPN SID exists in a local forwarding table; and if the forwarding path corresponding to the first SRv6 VPN SID exists, add the forwarding path including the first SRv6 VPN SID to the SRv6 tunnel policy; or if no forwarding path corresponding to the first SRv6 VPN SID exists, obtain the forwarding path from a controller side, and add the forwarding path including the first SRv6 VPN SID to the SRv6 tunnel policy.

In a possible implementation, the SRv6 tunnel policy further includes a weight value corresponding to the first SRv6 VPN SID, and the weight value is used to indicate that the processor allocates, based on the weight value, the data packet to the forwarding path corresponding to the first SRv6 VPN SID.

According to a sixth aspect, an embodiment of this application provides a border device. The border device is used in a communications system, and the communications system includes a first device, a second device, and a virtualized network function VNF. The VNF includes a plurality of virtual machines VMs. The first device is located in a first network, the second device is located in a second network, the border device is a border node between the first network and the second network, and the plurality of VMs communicate with the first device by using the second device. The border device includes: a memory; and a processor that is communicatively connected to the memory. The processor is configured to: receive a data packet sent by the first device through a first IPv6 segment routing SRv6 tunnel, where the first SRv6 tunnel is used to establish a communication connection between the first device and the border device, and the data packet carries a first SRv6 segment identifier SID; retrieve, based on the first SRv6 VPN SID, an SRv6 tunnel policy that corresponds to the first SRv6 VPN SID and that is from an SRv6 tunnel list, where the SRv6 tunnel policy indicates a second SRv6 tunnel between the border device and the second device, and the SRv6 tunnel policy includes a second SRv6 VPN SID; obtain a forwarding path corresponding to the second SRv6 VPN SID, where the forwarding path is used as a data transmission path when the border device communicates with the second device; and forward the data packet to the VNF based on the forwarding path by using the second device.

In a possible implementation, the first network may be a metropolitan area network and the second network may be a data center network DCN.

In a possible implementation, the processor is further configured to: receive a first routing message sent by the second device, where the first routing message carries the second SRv6 VPN SID and first address information, the second SRv6 VPN SID is generated by the second device based on a second routing message that is advertised by the VNF and that carries second address information, and the second address information is used to indicate a VM in the VNF; detect whether an SRv6 tunnel policy corresponding to the first address information exists; and if the SRv6 tunnel policy corresponding to the first address information exists, add the second SRv6 VPN SID to the SRv6 tunnel policy; or if no SRv6 tunnel policy corresponding to the first address information exists, generate the SRv6 tunnel policy, associate the SRv6 tunnel policy with the first address information, and add the second SRv6 VPN SID to the SRv6 tunnel policy.

In a possible implementation, the processor is configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

In a possible implementation, the processor is further configured to: if the SRv6 tunnel policy corresponding to the first address information is detected, detect whether the forwarding path corresponding to the first SRv6 VPN SID exists in a local forwarding table; and if the forwarding path corresponding to the second SRv6 VPN SID exists, add the forwarding path including the second SRv6 VPN SID to the SRv6 tunnel policy; or if no forwarding path corresponding to the second SRv6 VPN SID exists, obtain the forwarding path from a controller side, and add the forwarding path including the second SRv6 VPN SID to the SRv6 tunnel policy; or if the SRv6 tunnel policy corresponding to the first address information is not detected, generate the SRv6 tunnel policy, associate the SRv6 tunnel policy with the first address information, and detect whether the forwarding path corresponding to the second SRv6 VPN SID exists in a local forwarding table; and if the forwarding path corresponding to the second SRv6 VPN SID exists, add the forwarding path including the second SRv6 VPN SID to the SRv6 tunnel policy; or if no forwarding path corresponding to the second SRv6 VPN SID exists, obtain the forwarding path from a controller side, and add the forwarding path including the second SRv6 VPN SID to the SRv6 tunnel policy.

In a possible implementation, the SRv6 tunnel policy further includes a weight value corresponding to the second SRv6 VPN SID, and the weight value is used to indicate that the processor allocates, based on the weight value, the data packet to the forwarding path corresponding to the second SRv6 VPN SID.

According to a seventh aspect, an embodiment of this application provides a first device. The first device is used in a communications system, and the communications system further includes a second device and a virtualized network function VNF. The first device is located in a first network, the second device is located in a second network, the VNF includes a plurality of virtual machines VMs, and the VMs communicate with the first device by using the second device. The first device includes: a memory; and a processor that is communicatively connected to the memory. The processor is configured to: receive a first routing message sent by the second device, where the first routing message carries a first IPv6 segment routing segment identifier SRv6 VPN SID and first address information, the first SRv6 VPN SID is generated by the second device based on a second routing message that is sent by a first VM in the plurality of VMs and that carries second address information, the first address information is used to indicate the VNF, and the second address information is used to indicate the first VM; obtain a forwarding path corresponding to the first SRv6 VPN SID, where the forwarding path is used to indicate a data transmission path when the first device communicates with the second device; obtain an SRv6 tunnel based on the forwarding path; and if a data packet carrying the first address information is received, forward the data packet to the VNF based on the SRv6 tunnel by using the second device.

In a possible implementation, the processor is further configured to: detect whether an SRv6 tunnel policy corresponding to the first address information exists in an SRv6 tunnel list, where the SRv6 tunnel policy is used to indicate the SRv6 tunnel; and if the SRv6 tunnel policy corresponding to the first address information exists, add the forwarding path including the first SRv6 VPN SID to the SRv6 tunnel policy; or if no SRv6 tunnel policy corresponding to the first address information exists, generate the SRv6 tunnel policy, associate the SRv6 tunnel policy with the first address information, and add the forwarding path including the first SRv6 VPN SID to the SRv6 tunnel policy.

In a possible implementation, the first network is a metropolitan area network and the second network is a data center network DCN.

In a possible implementation, the first routing message may further carry a weight value corresponding to the first SRv6 VPN SID, and the weight value is used to indicate that the first device allocates, based on the weight value, the data packet to the forwarding path corresponding to the first SRv6 VPN SID.

In a possible implementation, the processor is configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

According to an eighth aspect, an embodiment of this application provides a border device. The border device is used in a communications system. The communications system further includes a first device, a second device, and a virtualized network function VNF. The VNF includes a plurality of virtual machines VMs. The first device is located in a first network, the second device is located in a second network, the border device is a border node between the first network and the second network, and the plurality of VMs communicate with the first device by using the second device. The border device includes: a memory; and a processor that is communicatively connected to the memory. The processor is configured to: receive a first routing message sent by the second device, where the first routing message carries a first IPv6 segment routing segment identifier SRv6 VPN SID and first address information, the first SRv6 VPN SID is generated by the second device based on a second routing message that is sent by a first VM in the plurality of VMs and that carries second address information, the first address information is used to indicate the VNF, and the second address information is used to indicate the first VM; obtain a forwarding path corresponding to the first SRv6 VPN SID, where the forwarding path is used to indicate a data transmission path when the border device communicates with the second device; obtain a first SRv6 tunnel based on the forwarding path; generate a second SRv6 VPN SID, and associate the second SRv6 VPN SID with the first SRv6 tunnel; send the second SRv6 VPN SID to the first device, so that the first device obtains a second SRv6 tunnel between the first device and the border device based on the second SRv6 VPN SID; and if a data packet that is sent by the first device and that carries the second SRv6 VPN SID is received, forward the data packet to the VNF based on the first SRv6 tunnel by using the second device.

In a possible implementation, the processor is further configured to: detect whether an SRv6 tunnel policy corresponding to the first address information exists in an SRv6 tunnel list, where the SRv6 tunnel policy is used to indicate the first SRv6 tunnel; and detect whether an SRv6 tunnel policy corresponding to the first address information exists in an SRv6 tunnel list, where the SRv6 tunnel policy is used to indicate the first SRv6 tunnel; and if no SRv6 tunnel policy corresponding to the first address information exists, generate the SRv6 tunnel policy, associate the SRv6 tunnel policy with the first address information, and add the forwarding path including the first SRv6 VPN SID to the SRv6 tunnel policy.

In a possible implementation, the first network may be a metropolitan area network and the second network may be a data center network DCN.

In a possible implementation, the first routing message may further carry a weight value corresponding to the first SRv6 VPN SID, and the weight value is used to indicate that the processor allocates, based on the weight value, the data packet to the forwarding path corresponding to the first SRv6 VPN SID.

In a possible implementation, the processor is configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information.

According to a ninth aspect, an embodiment of this application provides a computer-readable medium, configured to store a computer program. The computer program includes an instruction used to perform the method according to any one of the first aspect or the possible implementations of the first aspect.

According to a tenth aspect, an embodiment of this application provides a computer-readable medium, configured to store a computer program. The computer program includes an instruction used to perform the method according to any one of the second aspect or the possible implementations of the second aspect.

According to an eleventh aspect, an embodiment of this application provides a computer-readable medium, configured to store a computer program, and the computer program includes an instruction used to perform the method according to any one of the third aspect or the possible implementations of the third aspect.

According to a twelfth aspect, an embodiment of this application provides a computer-readable medium, configured to store a computer program. The computer program includes an instruction used to perform the method according to any one of the fourth aspect or the possible implementations of the fourth aspect.

According to a thirteenth aspect, an embodiment of this application provides a computer program. The computer program includes an instruction used to perform the method according to any one of the first aspect or the possible implementations of the first aspect.

According to a fourteenth aspect, an embodiment of this application provides a computer program. The computer program includes an instruction used to perform the method according to any one of the second aspect or the possible implementations of the second aspect.

According to a fifteenth aspect, an embodiment of this application provides a computer program. The computer program includes an instruction used to perform the method according to any one of the first aspect or the possible implementations of the first aspect.

According to a sixteenth aspect, an embodiment of this application provides a computer program. The computer program includes an instruction used to perform the method according to any one of the second aspect or the possible implementations of the second aspect.

According to a seventeenth aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

According to an eighteenth aspect, an embodiment of this application provides a chip. The chip includes a processing circuit and a transceiver pin. The transceiver pin and the processor communicate with each other through an internal connection path. The processor performs the method according to any one of the second aspect or the possible implementations of the second aspect, to control a receive pin to receive a signal, and control a transmit pin to send a signal.

According to a nineteenth aspect, an embodiment of this application provides a chip. The chip includes a processing circuit and a transceiver pin. The transceiver pin and the processor communicate with each other through an internal connection path. The processor performs the method according to any one of the first aspect or the possible implementations of the first aspect, to control a receive pin to receive a signal, and to control a transmit pin to send a signal.

According to a twentieth aspect, an embodiment of this application provides a chip. The chip includes a processing circuit and a transceiver pin. The transceiver pin and the processor communicate with each other through an internal connection path. The processor performs the method according to any one of the second aspect or the possible implementations of the second aspect, to control a receive pin to receive a signal, and control a transmit pin to send a signal.

According to a twenty-first aspect, an embodiment of this application provides a data transmission system. The system includes the first device and the border device in the first aspect, the second aspect, the third aspect, and the fourth aspect.

Brief To describe the technical solutions in the embodiments of this application more clearly, the following briefly describes the accompanying drawings for describing the embodiments of this application. It is clear that, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

The following clearly and describes the technical solutions in the embodiments of this application with reference to the accompanying drawings in the embodiments of this application. It is clear that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are used to distinguish between different target objects, but are not used to describe a specific order of the target objects.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "for example" or "example" or the like is intended to present a relative concept in a specific manner.

In the description of the embodiment of this application, unless otherwise stated, "multiple" means two or more than two. For example, a plurality of processing units are two or more processing units. A plurality of systems are two or more systems.

Figure 1:
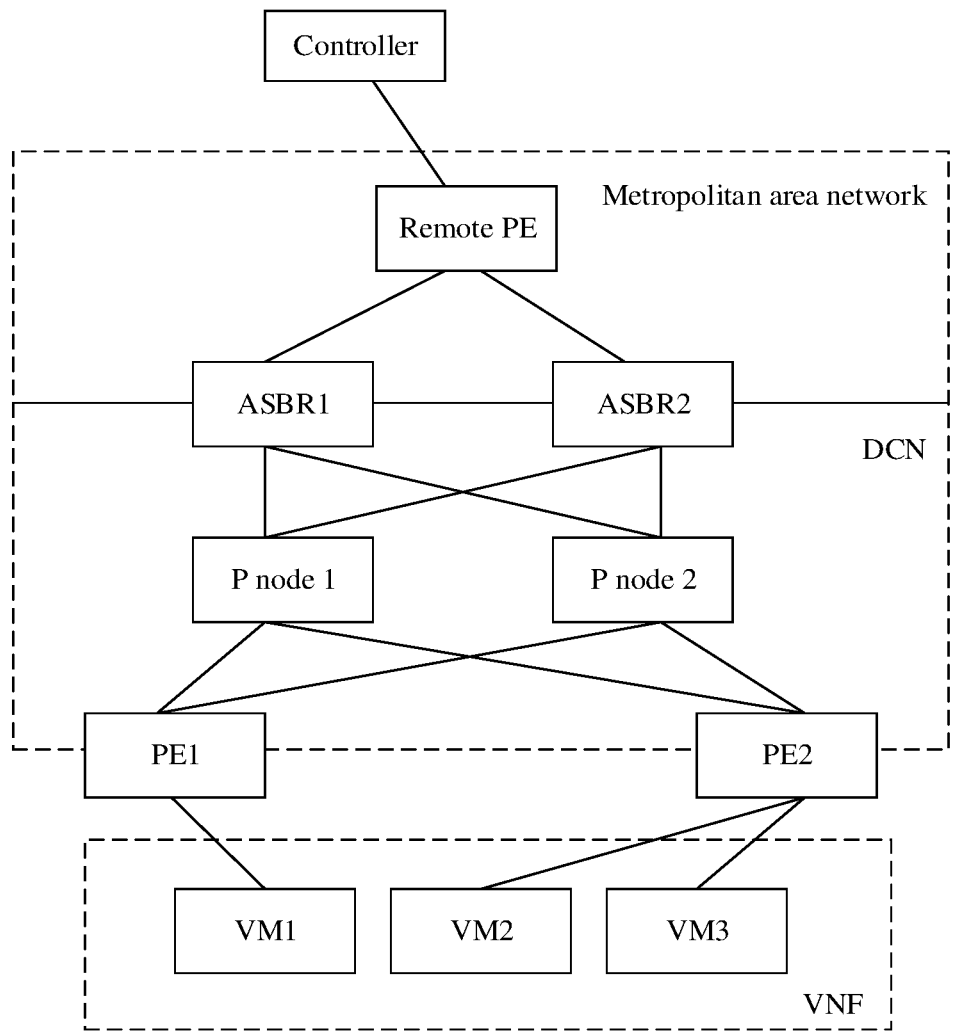
FIG. 1 is a first schematic diagram of an application scenario according to an embodiment of this application.

Before the technical solutions in the embodiments of this application are described, an application scenario of the embodiments of this application is first described with reference to the accompanying drawings. FIG. 1 is a schematic diagram of an application scenario according to an embodiment of this application. This scenario shows a system architecture in the embodiments of this application. The application scenario includes a metropolitan area network, a DCN network, and a cloud network (which may also be referred to as a cloud). The metropolitan area network includes a remote provider edge router (Remote PE) 1. The DCN network includes a provider backbone router (P) 1, a P node 2, a provider edge router (PE) 1, a PE2, and an autonomous system boundary router (ASBR)1 and an ASBR2 between the metropolitan area network and the DCN network. The cloud network is communicatively connected to the DCN network, and the cloud network includes at least one virtualized network function (VNF). The VNF includes a plurality of virtual machines (VM), such as a VM1, a VM2, and a VM3 shown in the figure. It should be noted that in an actual application, there may be one or more devices. A quantity of devices in the application scenario shown in FIG. 1 is merely an example. This is not limited in this application.

In addition, to better understand the technical solutions in this application, in the following embodiments, that an external interface address of the VM1 is 1.1.1.1, an external interface address of the VM2 is 1.1.1.2, an interface address of the VM3 is 1.1.1.3, an internet protocol version 6 (IPv6) network segment address (referred to as Locator below) of the PE1 is A1::1/64, an IPv6 network segment address of the PE2 is B1::1/64, and address information of the VNF is 202.1.1.1 is used as an example for detailed description.

A specific implementation solution of this application is described below with reference to the schematic diagram of the application scenario shown in FIG. 1

Scenario 1

Specifically, in this embodiment of this application, to implement end-to-end communication between the metropolitan area network (namely, a first network in this embodiment of this application) and the DCN network (namely, a second network in this embodiment of this application), a tunnel between the metropolitan area network and the DCN network needs to be established in advance. In the embodiments of this application, an IPv6 segment routing (SRv6)

technology is used to achieve the foregoing objective. The following uses an example in which the remote PE in FIG. 1 is used as a first device in this embodiment of this application, and the PE1 and the PE2 each are used as a second device in this embodiment of this application, to describe in detail a process of establishing the tunnel between the metropolitan area network and the DCN network.

Figures 2, 3:
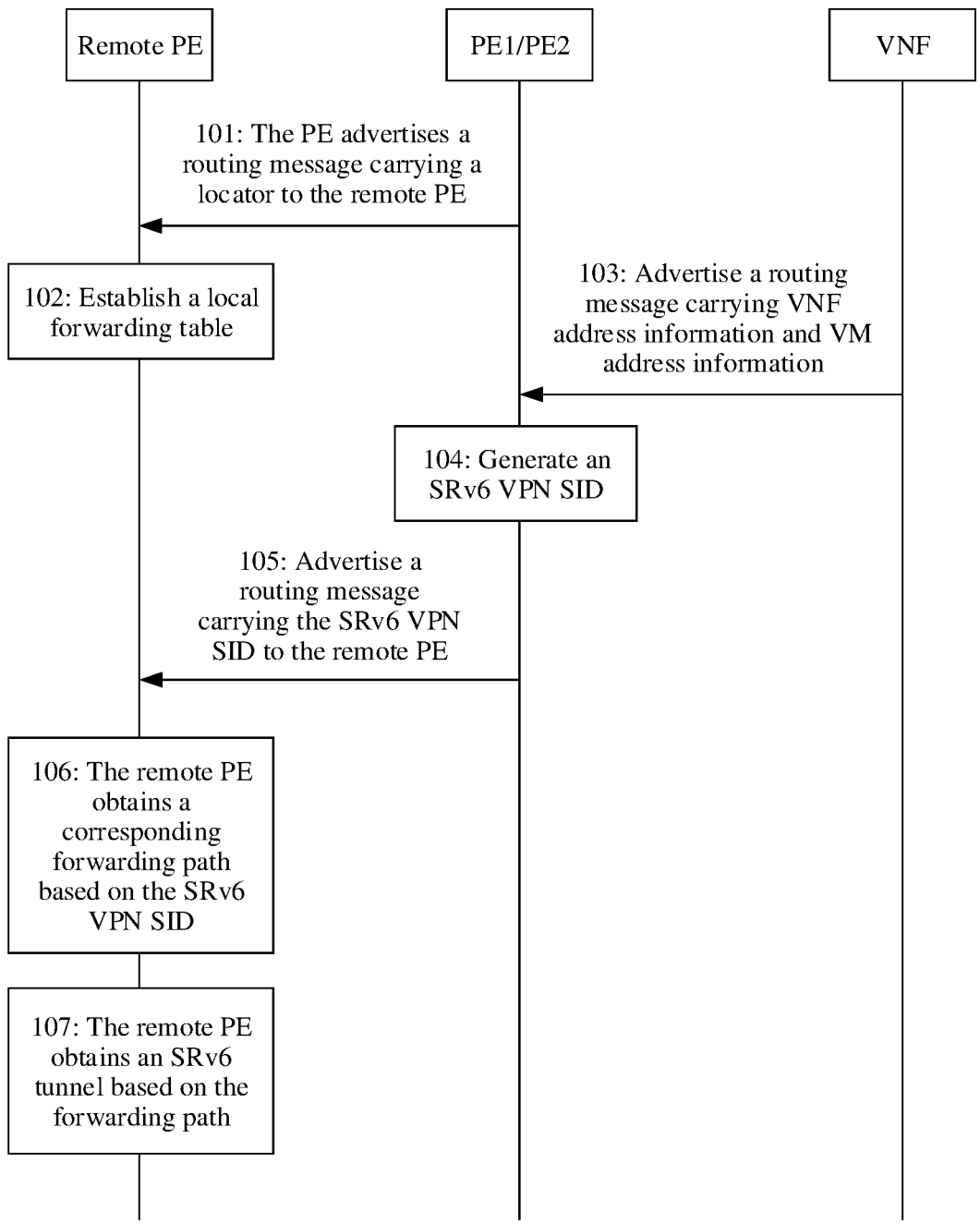
FIG. 2 is a first schematic flowchart of a data transmission method according to an embodiment of this application.
FIG. 3 is a schematic structural diagram of an SRv6 VPN SID according to an embodiment of this application.

With reference to FIG. 1, FIG. 2 is one of schematic flowcharts of a data transmission method according to an embodiment of this application. In FIG. 2, the method includes the following steps.

Step 101: The PE advertises a routing message carrying the locator to the remote PE.

Specifically, in this embodiment of this application, an operator modifies a configuration file to enable each of the PE1 and the PE2 devices to have an SRv6 capability and enable the PE1 and the PE2 to obtain the locators (in other words, the operator may configure the locators of the PE1 and the PE2 by using a controller). The locator of the PE1 is A1::1/64, and the locator of the PE2 is B1::1/64. Subsequently, the PE1 and the PE2 separately perform flooding in the DCN network by using an interior gateway protocol (IGP), to send the locators to each node in the DCN network, and import the locators to a node in the metropolitan area network by using the ASBR1 and the ASBR2.

Step 102: The remote PE establishes a local forwarding table.

Each of the remote PE and intermediate devices (including the ASBR1 and the ASBR2, the P node 1 and the P node 2, and other nodes that receive the locators and that are not shown in the figure) generates a corresponding forwarding entry in the local forwarding table based on the received locator, where the forwarding entry is used to indicate a forwarding path from each of the remote PE and the intermediate devices to a device corresponding to the locator, namely, the PE1 or the PE2. For example, when receiving a data packet, each node in a system matches a destination address of the data packet with the local forwarding entry to obtain a next-hop address, encapsulates the next-hop address into the data packet, and sends the data packet to a device corresponding to the next-hop address. In other words, the devices on the forwarding path perform actions in turn, to forward the data packet. Therefore, each forwarding entry in the generated list includes but is not limited to a next-hop address corresponding to a device indicated by the locator. For a forwarding entry generation method, refer to the method in the existing technical embodiment. Details are not described in this application again.

Step 103: The VNF advertises a routing message carrying VNF address information and VM address information.

Specifically, in this embodiment of this application, the VNF establishes a border gateway protocol (BGP) peer relationship with the PE1 and the PE2 in the DCN network, and then the VNF advertises a BGP routing message to the PE1 through an external interface of the VM1. The routing message includes but is not limited to the external interface address 1.1.1.1 of the VM1 and the address information 202.1.1.1 of the VNF. In addition, the VNF advertises a BGP routing message to the PE2 through an external interface of the VM2. The routing message includes but is not limited to the external interface address 1.1.1.2 of the VM2 and the address information 202.1.1.1 of the VNF. The VNF advertises a BGP routing message to the PE2 through an external interface of the VM3. The routing message includes but is not limited to the external interface address 1.1.1.3 of the VM3 and the address information 202.1.1.1 of the VNF. It should be noted that a communication connection is pre-established between the VM1 and the PE1, and communication connections are pre-established between the VM2 and the PE2 and between the VM3 and the PE2. Therefore, the routing message advertised by the VM1 through the interface is transmitted to the PE1, and the routing messages advertised by the VM2 and the VM3 through the interface are transmitted to the PE2. It should be noted that the address information of the VNF in this embodiment is first address information in this embodiment of this application, and the address information of the VMs 1 to 3 is second address information in this embodiment of this application.

In this embodiment of this application, the VNF may be set to periodically (a period may be set based on an actual requirement) send the routing message to the PE through the interface of the VM, so as to update network information in a timely manner, and avoid a problem, for example, a data packet forwarding error caused by information aging.

Step 104: The PE generates an SRv6 VPN segment identifier (SID).

The PE1 receives the routing message from the VM1, and extracts interface address information (namely, the interface address information 1.1.1.1 of the VM1) and the VNF address information (namely, 202.1.1.1) from the routing message. The PE1 generates an SRv6 VPN SID for the routing message. FIG. 3 is a schematic structural diagram of the SRv6 VPN SID. As shown in FIG. 3, the SRv6 VPN SID includes the locator and attribute information (a function part in the figure). A value of the locator is an IPv6 network segment address (A1::1/64) of the PE1. A value of the function part may be randomly generated and need to be unique in a locator range, in other words, uniqueness of each SRv6 VPN SID is implemented. Therefore, with reference to FIG. 3, the SRv6 VPN SID generated by the PE for the VM may be understood as a combination of two parts: the locator value of the PE and the randomly generated value. In this embodiment, the PE1 generates an SRv6 VPN SID1 for the routing message from the VM1. A locator value is A1::1/64, and a value of a function part is :1, so that the SRv6 VPN SID1 is A1::1:1/128.

Based on the routing message sent by the VM2, the PE2 generates an SRv6 VPN SID2: B1::1:2/128. Based on the routing message sent by the VM3, the PE2 generates an SRv6 VPN SID3: B1::1:3/128. Specific details are described above, and details are not described herein again. It should be noted that the SRv6 VPN SIDs 1 to 3 in this embodiment are first SRv6 VPN SIDs in this embodiment of this application.

Then, the PE1 writes the SRv6 VPN SID1 (A1::1:1/128), type information of the SRv6 VPN SID1, next-hop address information (namely, the address information of the VM1: 1.1.1.1), and outbound interface address information (an outbound interface address through which the PE1 sends data to 1.1.1.1) into a local SID list. The type information of the SRv6 VPN SID1 is END.DX4, and the type information is used to indicate a device to decapsulate a data packet after receiving the data packet, that is, decapsulate an outermost header of the data packet to obtain an original data packet, and send a decapsulated data packet to a device corresponding to the next-hop address information through an outbound interface recorded in the local SID list.

Step 105: The PE advertises a routing message carrying the SRv6 VPN SID to the remote PE.

Specifically, in this embodiment of this application, the PE1 converts the received routing message into a routing message (BGP routing message) that supports a transmission protocol between the PE and the remote PE, and advertises the BGP routing message to the remote PE by establishing a BGP peer relationship between the PE1 and the remote PE. The BGP routing message carries the address information (202.1.1.1) of the VNF and the SRv6 VPN SID1 (A1::1:1/128). Similarly, the PE2 sends a BGP routing message carrying the SRv6 VPN SID to the remote PE. The routing message sent by the PE2 carries the address information (202.1.1.1) of the VNF, the SRv6 VPN SID2, and the SRv6 VPN SID3. In other words, SRv6 VPN SIDs generated corresponding to a same PE are included in a same routing message and the same routing message is sent to the remote PE, so that the remote PE updates the SRv6 VPN SIDs with a same locator, in other words, from the same PE, in an SRv6 tunnel policy. Detailed update steps are described in the following embodiments. Details are not described herein. Other operations of the PE2 are similar to those of the PE1, and are not described herein.

Step 106: The remote PE obtains a corresponding forwarding path based on the SRv6 VPN SID.

Specifically, in this embodiment of this application, the remote PE performs matching in the local forwarding table based on the SRv6 VPN SID, to determine whether the forwarding path corresponding to the SRv6 VPN SID can be obtained by using the local forwarding table (for a specific obtaining method, refer to the foregoing step 102). If no matched entry is found in the local forwarding table, the remote PE requests the forwarding path corresponding to the SRv6 VPN SID from the controller. Then, the controller delivers the forwarding path corresponding to the SRv6 VPN SID to the remote PE. The forwarding path delivered by the controller carries an SRv6 address corresponding to each node on the forwarding path, so that the data packet is forwarded to a device corresponding to the SRv6 VPN SID through the forwarding path.

Step 107: The remote PE obtains an SRv6 tunnel based on the forwarding path.

Specifically, in this embodiment of this application, the remote PE detects whether an SRv6 tunnel policy (referred to as an SRv6 policy below) corresponding to the VNF address information exists in an SRv6 tunnel list. If the SRv6 tunnel policy corresponding to the VNF address information exists, it indicates that an SRv6 tunnel has been established between the remote PE and the VNF (it should be noted that, the tunnel between the remote PE and the VNF does not mean that tunnel endpoints are the remote PE and the VNF, but the tunnel endpoints are the remote PE and a PE to which the VNF belongs (namely, a PE that establishes a communication connection to the VNF)). In other words, the SRv6 policy is used to indicate the SRv6 tunnel between the remote PE and the VNF. The remote PE can add the forwarding path including the SRv6 VPN SID to the SRv6 policy. If no SRv6 policy corresponding to the VNF address information exists, the remote PE generates the SRv6 policy to establish an SRv6 tunnel and associates the SRv6 policy with the address information of the VNF. Then, the remote PE can add the forwarding path including the SRv6 VPN SID to the SRv6 policy. To better understand step 106 and step 107, the following uses specific implementation as an example for detailed description.

Specifically, after receiving the BGP routing message sent by the PE1, the remote PE extracts the address information (202.1.1.1) of the VNF and the SRv6 VPN SID1 (A::1:1/128) from the BGP routing message. The remote PE detects whether the SRv6 tunnel policy corresponding to 202.1.1.1 exists in the local SRv6 tunnel list. If no SRv6 policy corresponding to 202.1.1.1 exists, the remote PE establishes the SRv6 policy and associates the SRv6 policy with 202.1.1.1 to establish an SRv6 tunnel between the remote PE and the VNF (the tunnel endpoint is the PE). Then, the remote PE matches the SRv6 VPN SID1 (A::1:1/128) with the local forwarding table according to a longest match principle. In other words, whether a next-hop address obtained by reaching the PE1 device corresponding to the SRv6 VPN SID1 (A::1:1/128) exists is detected. Alternatively, whether a forwarding path between the remote PE and the PE1 device exists is detected (for a specific matching method, refer to an existing technical embodiment, and this is not limited in this application). If a forwarding path corresponding to the SRv6 VPN SID1 (A1::1:1/128) exists, the remote PE generates an SRv6 tunnel policy entry (SID-LIST for short) based on the SRv6 VPN SID1 (A1::1:1/128). The SID-LIST is used to indicate that the forwarding path between the remote PE and the PE1 exists, and adds the forwarding path including the SRv6 VPN SID1 (A1::1:1/128) to the SRv6 policy. It should be noted that the SRv6 policy may be used to indicate the SRv6 tunnel between the remote PE and the PE1. A plurality of SID-LISTs included in the SRv6 policy are used to indicate that there are a plurality of forwarding paths under the SRv6 policy. In other words, the SRv6 tunnel may be reached through the plurality of forwarding paths, and each SID-LIST includes a corresponding SRv6 VPN SID.

In an embodiment, if no forwarding path corresponding to the SRv6 VPN SID1 (A::1:1/128) exists, the remote PE requests the controller to deliver a transmission path that may reach the PE1 device corresponding to the SRv6 VPN SID1 (A::1:1/128), and an SRv6 VPN SID corresponding to each important node on the transmission path. For example, still referring to FIG. 1, if the remote PE requests the controller to deliver the transmission path that may reach the PE1 device corresponding to the SRv6 VPN SID1 (A1::1: 1/128) and related node information, the controller returns a response message to the remote PE. The response message carries an SRv6 address of the ASBR1, an SRv6 address of the P node 1, and an SRv6 address of the PE1. For example, if the SRv6 address of the ASBR1 is C1::1/64, and the SRv6 address of the P node 1 is D1::1/64, the remote PE generates one SID-LIST based on C1::1/64 (the SRv6 address of the ASBR1), D1::1/6 (the SRv6 address of the P node 1), and the SRv6 VPN SID1 (A1::1:1/128), to add a forwarding path including the SRv6 address of the ASBR1, the SRv6 address of the P node 1, and the SRv6 VPN SID1 (A::1:1/128) to the SRv6 policy. The remote PE processes the BGP routing message sent by the PE2 in the same way. In other words, the remote PE adds a forwarding path including the SRv6 VPN SID2 (B1::1:2/128) and a forwarding path including the SRv6 VPN SID3 (B1::1:3/128) to the SRv6 policy associated with 202.1.1.1.

In another embodiment, if the remote PE detects that an SRv6 tunnel policy corresponding to 202.1.1.1 exists in the local SRv6 tunnel list, the remote PE detects whether the forwarding path corresponding to the SRv6 VPN SID1 (A1::1:1/128) exists in the local forwarding table. If the forwarding path corresponding to the SRv6 VPN SID1 (A::1:1/128) exists, the remote PE adds the forwarding path including the SRv6 VPN SID1 to the SRv6 tunnel policy. If no forwarding path corresponding to the SRv6 VPN SID1 (A::1:1/128) exists, the remote PE requests the forwarding path from the controller and adds the forwarding path including the SRv6 VPN SID1 to the SRv6 tunnel policy. For specific details, refer to the foregoing description. Details are not described herein again.

Figure 4:
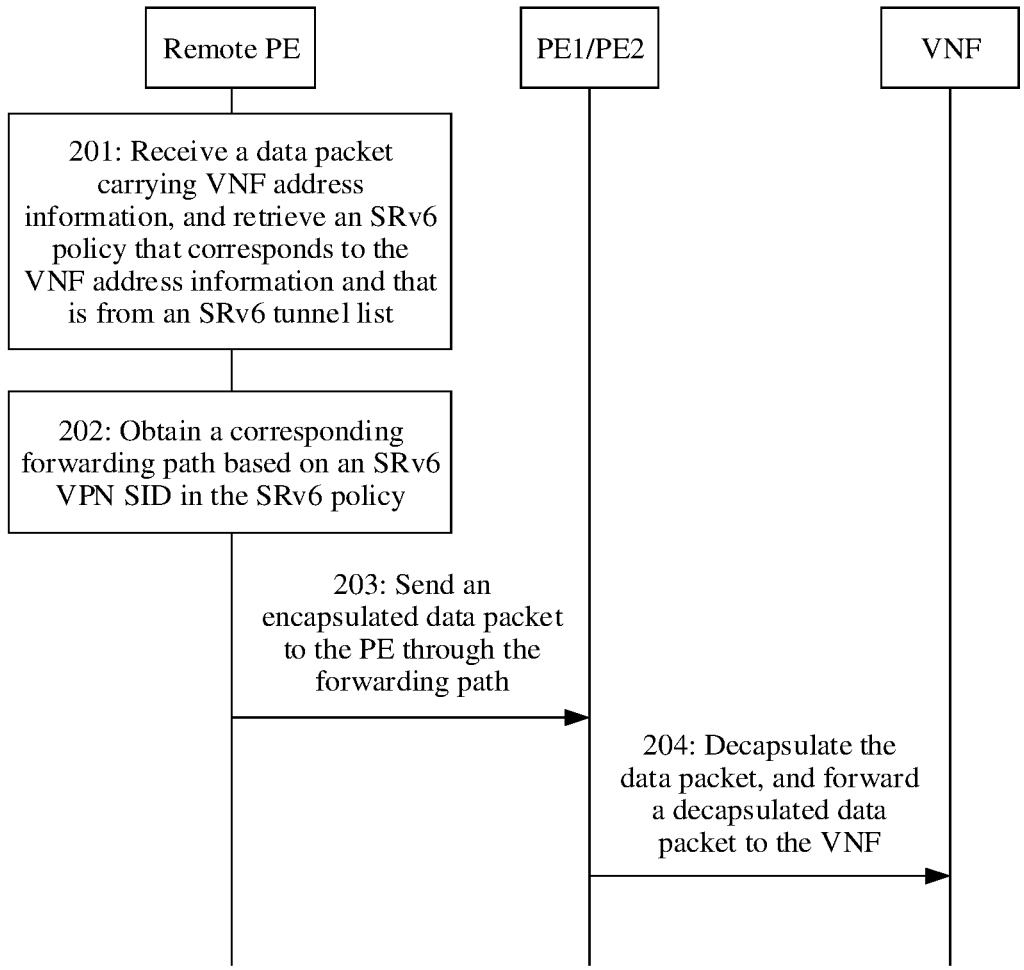
FIG. 4 is a first schematic flowchart of a data transmission method according to an embodiment of this application.

FIG. 4 is one of schematic flowcharts of a data transmission method according to an embodiment of this application.

Specifically, a process of performing end-to-end data transmission based on an established SRv6 tunnel is involved. In FIG. 4, the method includes the following steps.

Step 201: A remote PE receives a data packet carrying VNF address information, and retrieves an SRv6 policy that corresponds to the VNF address information and that is from an SRv6 tunnel list.

Specifically, the remote PE receives a data packet carrying VNF address information (202.1.1.1), and extracts the VNF address information from the data packet. Then, the remote PE retrieves, based on 202.1.1.1, whether an SRv6 policy associated with 202.1.1.1 exists in the SRv6 tunnel list. If the SRv6 policy associated with 202.1.1.1 exists, it can be determined that an SRv6 tunnel exists between the remote PE and a VNF.

Step 202: The remote PE obtains a corresponding forwarding path based on an SRv6 VPN SID in the SRv6 policy.

Specifically, in this embodiment of this application, if the remote PE detects that the SRv6 policy associated with 202.1.1.1 exists, the remote PE obtains at least one SID-LIST included in the SRv6 policy. It should be noted that if the remote PE detects a quantity of SID-LISTs in the SRv6 policy, it can be determined that a quantity of forwarding paths exist between the remote PE and the VNF. Then, the remote PE retrieves each SID-LIST from the SRv6 policy to determine the quantity of forwarding paths between the remote PE and a PE. Then, the remote PE extracts an SRv6 VPN SID included in each SID-LIST. For example, the remote PE obtains an SID-LIST including an SRv6 VPN SID1 (A::1:1/128), an SID-LIST including an SRv6 VPN SID2 (B1::1:2/128), and an SID-LIST including an SRv6 VPN SID3 (B1::1:3/128) from the SRv6 policy. The remote PE matches each SRv6 VPN SID with a local forwarding table according to a longest match principle to determine whether the remote PE has a forwarding path to the PE. If the remote PE does not match the forwarding path corresponding to the SRv6 VPN SID, the remote PE requests a controller to deliver a forwarding path and an SRv6 address corresponding to each important node on the forwarding path.

Then, the remote PE may perform load sharing on the data packet based on obtained three forwarding paths, that is, separately send the data packet to a VM1, a VM2, and a VM3 through the three forwarding paths, so as to implement load sharing. This reduces load pressure of a device, and improves system utilization and data processing efficiency. For a specific load sharing rule, refer to a technology in an existing technical embodiment. Details are not described in this application again.

Figure 5:
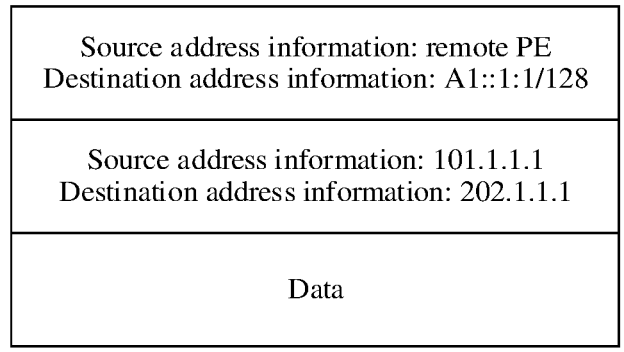
FIG. 5 is a schematic structural diagram of a data packet according to an embodiment of this application.

Specifically, the remote PE encapsulates a data packet transmitted to each forwarding path, and an example in which the data packet is transmitted to a forwarding path corresponding to the SRv6 VPN SID1 is used. Specifically, the remote PE encapsulates the SRv6 VPN SID1 (A::1:1/128) into the data packet, and a structure of the data packet is shown in FIG. 5. In FIG. 5, an outermost header of an encapsulated data packet includes source address information (namely, address information of the remote PE) and destination address information (namely, A1::1:1/128). In an embodiment, if the forwarding path obtained by the remote PE is delivered by the controller, in the encapsulated data packet, a segment routing header (Segment Routing Header, SRH) further needs to be encapsulated between an IPv6 header and an original data packet header. The SRH includes SRv6 address information corresponding to each node on the forwarding path delivered by the controller, to indicate each node to transmit the data packet according to an indication of the SRH. For a specific form of the SRH, refer to the technical solutions in the existing technical embodiments. Details are not described in this application again.

Step 203: The remote PE sends the encapsulated data packet to the PE through the forwarding path.

Specifically, in this embodiment of this application, the remote PE sends the data packet to an ASBR1 on the forwarding path, and then the data packet reaches a PE1 through a P node 1. Data exchange between the remote PE and the ASBR1 and between the remote PE and the PE1 is based on an SRv6 protocol. In other words, in a data transmission process, for a data packet sent by the remote PE to the ASBR1, sent by the ASBR1 to the P node 1, and sent by the P node 1 to the PE1, only outermost source address information needs to be modified in the transmission process, and a protocol type of the data packet does not need to be modified based on different transmission channel types in a conventional technology, thereby simplifying the data transmission process. In addition, devices on a DCN network and a cloud network can be controlled by the remote PE side, and management difficulty is reduced.

Based on the load sharing rule, similarly, the remote PE processes a data packet sent to a forwarding path corresponding to the SRv6 VPN SID2 and a data packet sent to a forwarding path corresponding to the SRv6 VPN SID3. In other words, the remote PE re-encapsulates the data packet sent to the forwarding path, to enable the data packet to carry the SRv6 VPN SID corresponding to the forwarding path. The data packet may be transmitted, through the forwarding path, to a PE device (namely, a PE2) corresponding to the SRv6 VPN SID2 and the SRv6 VPN SID3.

Step 204: The PE decapsulates the data packet, and forwards a decapsulated data packet to the VNF.

Specifically, in this embodiment of this application, the PE1 is used as an example. The PE1 receives the structure of the data packet shown in FIG. 5, and extracts the SRv6 VPN SID1 (A1::1:1/128) from the outermost data packet header of the data packet. Then, the PE1 matches the SRv6 VPN SID1 (A::1:1/128) with at least one entry recorded in a local SID list to obtain association information corresponding to the SRv6 VPN SID1 (A1::1:1/128). In this embodiment, the association information of the SRv6 VPN SID1 (A::1:1/128) obtained by the PE1 includes type information (END.DX4) of the SRv6 VPN SID1, next-hop address information (1.1.1.1), and outbound interface address information. Then, the PE1 decapsulates the data packet based on the type information of the SRv6 VPN SID1, namely, an indication of END.DX4, to obtain an original data packet, and sends the data packet to the VM1 corresponding to the next-hop address information (1.1.1.1) by using the obtained outbound interface address information. A processing step in the PE2 is similar to that in the PE1. That is, the PE2 separately sends the data packet to the VM2 and the VM3. For specific details, refer to transmission steps in the PE1, and details are not described herein again.

In conclusion, in the technical solutions in the embodiments of this application, the SRv6 technology is used to integrate the metropolitan area network and the DCN network, to implement end-to-end communication. This decreases network transmission complexity, simplifies management, and effectively improves user experience.

Scenario 2

Specifically, with reference to FIG. 1, in this scenario, the VNF may set a corresponding weight value based on a load status of each VM, so that the remote PE performs load sharing on a data packet based on a preset weight value in a data transmission process. A specific process is as follows.

Figure 6:
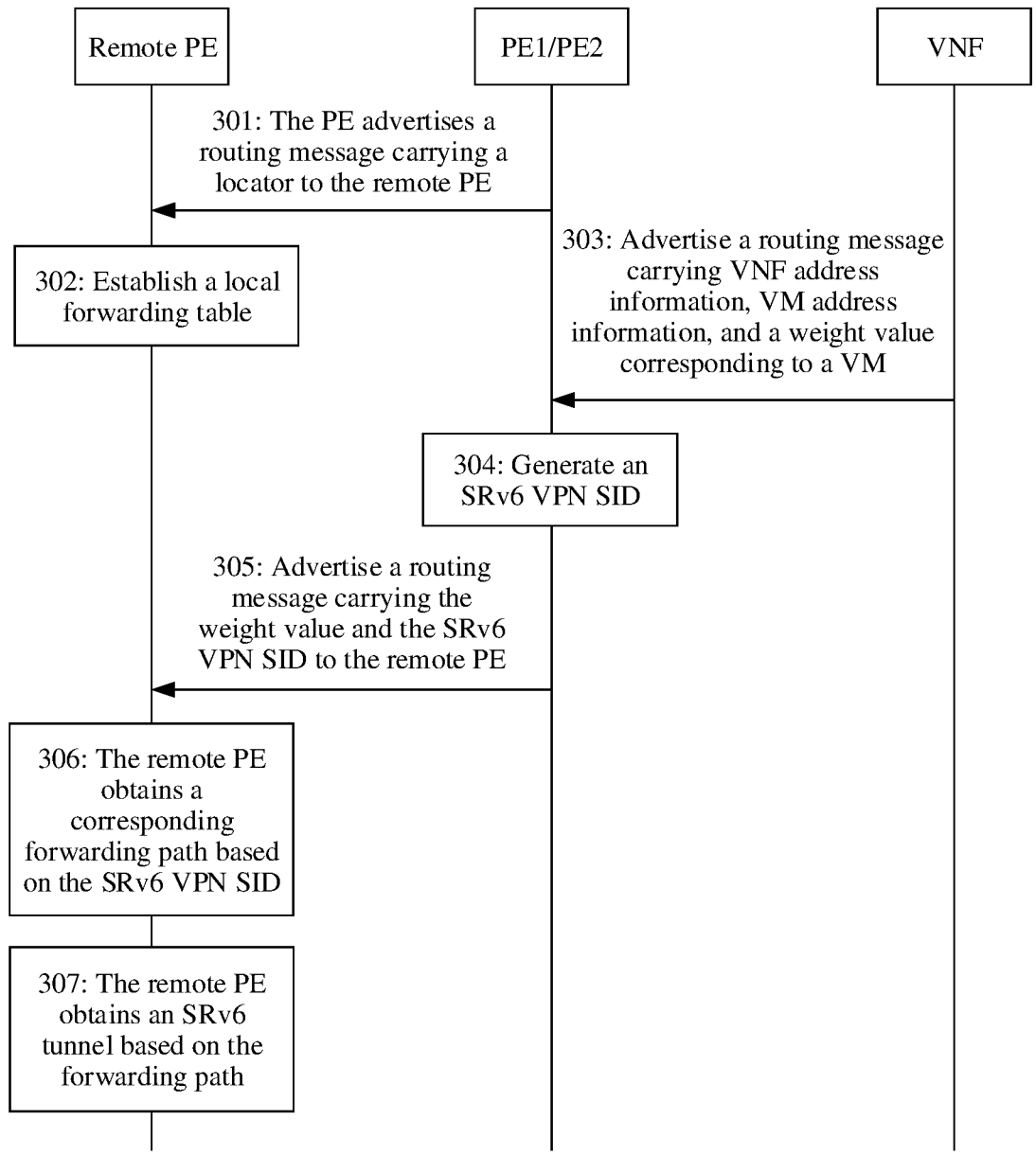
FIG. 6 is a first schematic flowchart of a data transmission method according to an embodiment of this application.

With reference to FIG. 1, FIG. 6 is one of schematic flowcharts of a data transmission method according to an embodiment of this application. In FIG. 6, the method includes the following steps.

Step 301: The PE advertises a routing message carrying the locator to the remote PE.

For this step, refer to step 101 in the scenario 1. Details are not described herein again.

Step 302: The remote PE establishes a local forwarding table.

For this step, refer to step 102 in the scenario 1. Details are not described herein again.

Step 303: The VNF advertises a routing message carrying VNF address information, VM address information, and a weight value corresponding to a VM.

Specifically, in this embodiment, the routing message sent by the VNF to the PE may carry the weight value, so that the PE forwards the weight value to the remote PE. Therefore, the remote PE performs load balancing processing on a data packet based on the weight value in a process of forwarding the data packet. For example, as described in the scenario 1, the VNF may periodically send the routing message to the PE. Therefore, at a moment when a period arrives, the VNF may obtain a current load status of each VM from a monitoring device, and determine, based on the load status, a weight value corresponding to each VM. For a specific manner of determining the weight value, refer to the existing technical embodiment. Details are not described in this application again. For example, the VNF determines that a weight value of the VM1 is 5, a weight value of the VM2 is 10, and a weight value of the VM3 is 10. In this case, in addition to carrying the address information (1.1.1.1) of the VM1 and the address information (202.1.1.1) of the VNF, a routing message that is corresponding to the VM1 and that is sent by the VNF to the PE1 further carries the weight value (the weight value is 5) of the VM1.

For details about other steps, refer to step 103 in the scenario 1. Details are not described herein again.

Step 304: The PE generates an SRv6 VPN SID.

For specific details of this step, refer to step 104 in the scenario 1. Details are not described herein again.

Step 305: The PE advertises a routing message carrying the weight value and the SRv6 VPN SID to the remote PE.

For specific details of this step, refer to step 105 in the scenario 1. Details are not described herein again. Different from step 104, the routing message advertised by the PE to the remote PE further carries the weight value in step 302.

Step 306: The remote PE obtains a corresponding forwarding path based on the SRv6 VPN SID.

Step 307: The remote PE obtains an SRv6 tunnel based on the forwarding path.

Specifically, in this embodiment, in addition to carrying the generated SRv6 VPN SID and the address information (202.1.1.1) of the VNF, a BGP routing message sent by the PE to the remote PE further carries the weight value. The remote PE adds the weight value and the forwarding path including the SRv6 VPN SID to an SRv6 tunnel policy. For example, if the weight value of the VM1 is 5 and the remote PE obtains the weight value 5 of the VM1 from the PE1, after generating a corresponding SRv6 tunnel policy, the remote PE correspondingly adds a forwarding path including an SRv6 VPN SID1 (A1::1:1/128) and the weight value 5 to the SRv6 tunnel policy. In other words, a weight value of the forwarding path corresponding to the SRv6 VPN SID1 (A1::1:1/128) is 5.

For details about other steps, refer to step 106 and step 107 in the scenario 1. Details are not described herein again.

Figure 7:
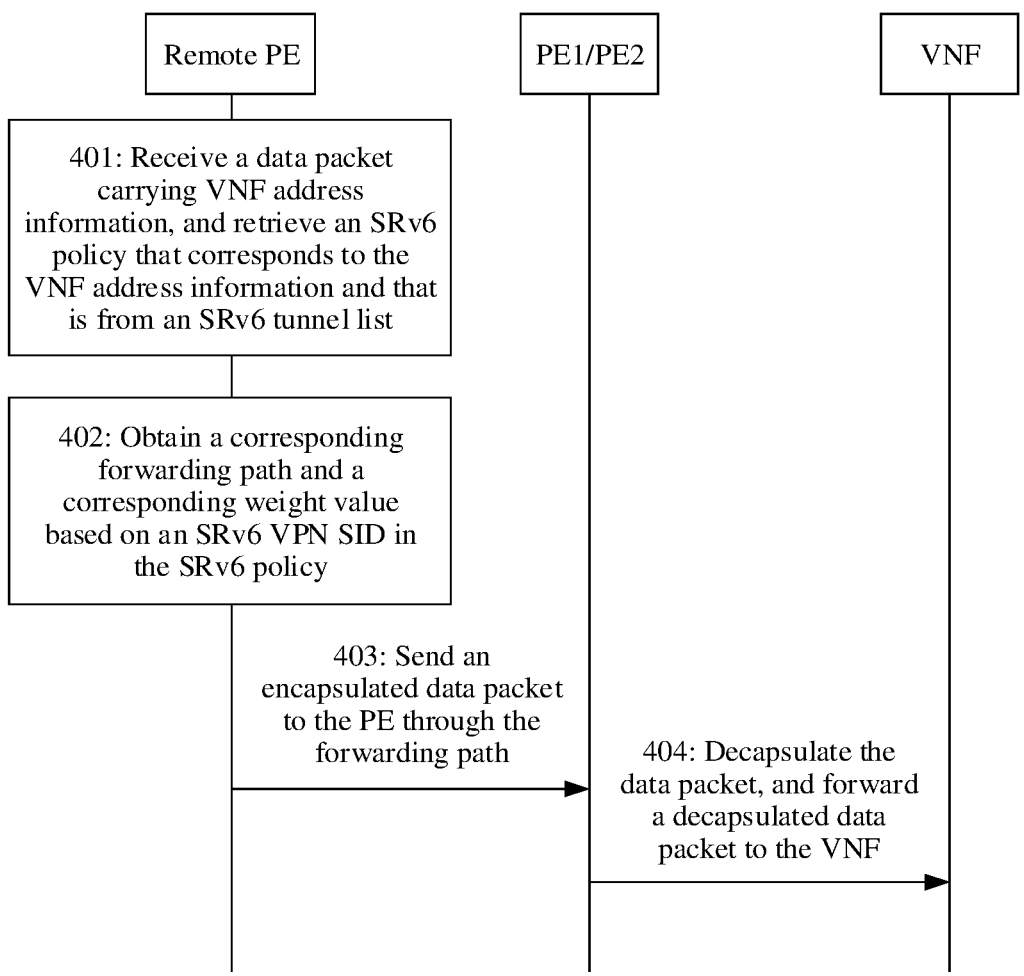
FIG. 7 is a first schematic flowchart of a data transmission method according to an embodiment of this application.

In this embodiment of this application, a process in which the remote PE performs load sharing on the data packet based on the set weight value is as follows:

With reference to FIG. 1, FIG. 7 is one of schematic flowcharts of a data transmission method according to an embodiment of this application. In FIG. 7, the method includes the following steps.

Step 401: A remote PE receives a data packet carrying VNF address information, and retrieves an SRv6 policy that corresponds to the VNF address information and that is from an SRv6 tunnel list.

For specific step details, refer to step 201 in the scenario 1. Details are not described herein again.

Step 402: The remote PE obtains a corresponding forwarding path and a corresponding weight value based on an SRv6 VPN SID in the SRv6 policy.

Specifically, in this embodiment, the remote PE may obtain the forwarding path corresponding to the SRv6 VPN SID and the corresponding weight value from the SRv6 policy.

For details about other steps, refer to step 202 in the scenario 1. Details are not described herein again.

Step 403: The remote PE sends an encapsulated data packet to a PE through the forwarding path.

Specifically, in this embodiment of this application, when performing load sharing on the data packet, the remote PE may allocate a corresponding quantity of data packets to each forwarding path based on an obtained weight value corresponding to each forwarding path.

For details about other steps, refer to step 203 in the scenario 1. Details are not described herein again.

Step 404: The PE decapsulates the data packet, and forwards a decapsulated data packet to a VNF.

For specific details of this step, refer to step 204 in the scenario 1. Details are not described herein again.

In conclusion, in the technical solution in this embodiment of this application, the VNF sets the corresponding weight value based on the load status of the VM, and advertises the set weight value to the remote PE, so that the remote PE can perform load sharing on the data packet based on the weight value corresponding to each forwarding path during data packet transmission. This can effectively reduce load pressure of a high-load device, improve utilization of a low-load device, and further improve overall performance of the system.

Scenario 3

Figure 8:
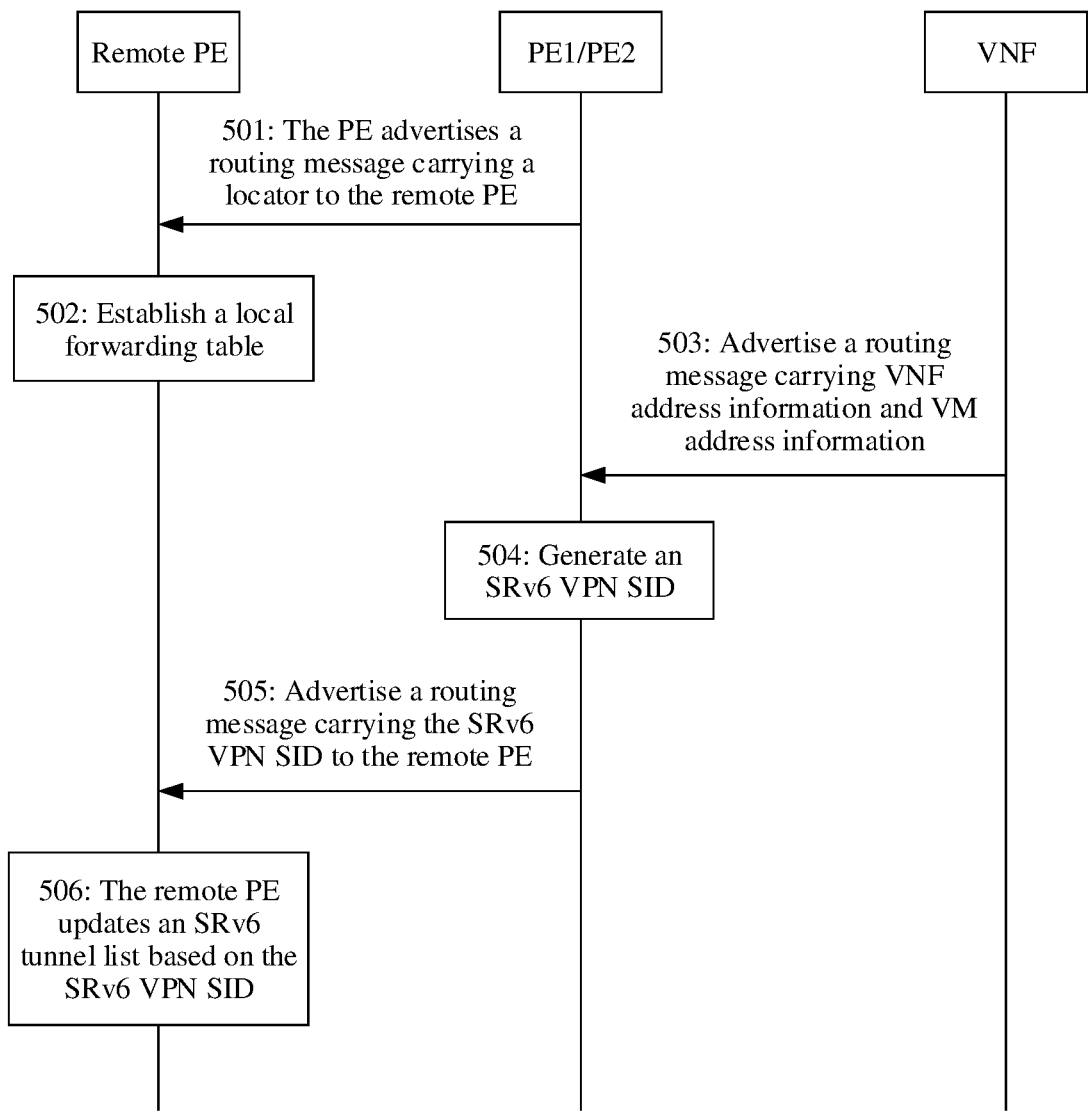
FIG. 8 is a first schematic flowchart of a data transmission method according to an embodiment of this application.

Specifically, with reference to FIG. 1, in this scenario, if a status of any VM in the VNF is updated (the status update includes VM deletion, VM migration, VM interface update, VM addition, and the like), that is, after an original interface address of the VM changes or a PE that is communicatively connected to the VM also changes, the VNF may notify, by using a routing message sent to the PE, the remote PE of a virtual update status by using the PE in a current cloud network in a timely manner. A specific process is as follows:

With reference to FIG. 1, FIG. 8 is one of schematic flowcharts of a data transmission method according to an embodiment of this application. In FIG. 8, the method includes the following steps.

Step 501: The PE advertises a routing message carrying the locator to the remote PE.

For this step, refer to step 101 in the scenario 1. Details are not described herein again.

Step 502: The remote PE establishes a local forwarding table.

For this step, refer to step 102 in the scenario 1. Details are not described herein again.

Step 503: The VNF advertises a routing message carrying VNF address information and VM address information.

Specifically, in this embodiment, after the state of any VM in the VNF changes, the VNF updates all routing messages. In other words, the VNF re-sends, through an interface corresponding to each VM, a routing message to a PE device corresponding to each VM.

Figure 9:
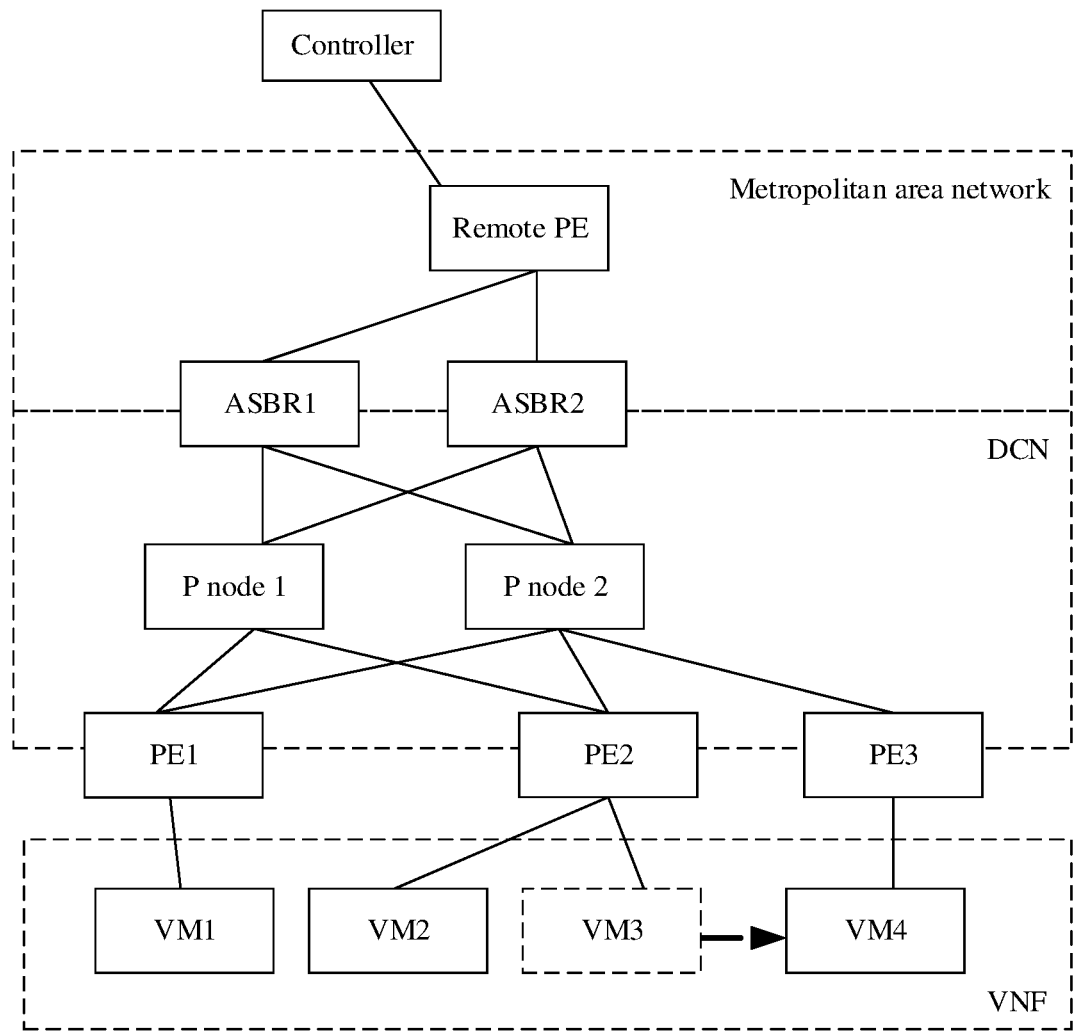
FIG. 9 is a first schematic diagram of an application scenario according to an embodiment of this application.

The following provides detailed description by using an example in which the VM3 is migrated to a PE3. FIG. 9 is a diagram of a system architecture after the VM is migrated. After the VM3 is migrated to the PE3, to better distinguish with the previous VM3, the following provides detailed description by using an example in which the migrated VM is a VM4. Specifically, the VM3 is migrated to the PE3, a communication connection is established between the VM4 and the PE3, and interface address information is updated to 1.1.1.4 (after the VM3 is migrated to the PE3, an interface address may also remain unchanged, namely, still 1.1.1.3). In this case, when the VNF perceives that a status of a VM to which the VNF belongs changes, a route re-sending mechanism is triggered. In other words, the VNF advertises, to the PE1 through an external interface of the VM1, a routing message that carries the interface address information (1.1.1.1) of the VM1 and the VNF address information (202.1.1.1). The VNF advertises, to the PE2 through an interface of the VM2, a routing message that carries the interface address information (1.1.1.2) of the VM2 and the VNF address information (202.1.1.1). The VNF advertises, to the PE3 through an interface of the VM4, the interface address information (0.1.1.4) of the VM4 and the VNF address information (202.1.1.1).

Step 504: The PE generates an SRv6 VPN SID.

The PE1 receives a routing message from the VM1, the PE2 receives a routing message from the VM2, and the PE3 (namely, the third device in this embodiment of this application) receives a routing message from the VM4. Then, the PE1, the PE2, and the PE3 respectively generate corresponding SRv6 VPN SIDs based on the respective received routing information. An example in which an SRv6 VPN SID1 generated by the PE1 for the VM1 is A1::1:1/128, and an SRv6 VPN SID2 generated by the PE2 for the VM2 is B1::1:2/128 is used. An SRv6 VPN SID4 generated by the PE3 for the VM4 is C1::1:4/128. The PEs 1 to 3 write the SRv6 VPN SIDs and corresponding association information into a local SID list.

For details about other steps, refer to step 104 in the scenario 1. Details are not described herein again.

Step 505: The PE advertises a routing message carrying the SRv6 VPN SID to the remote PE.

For specific details of this step, refer to step 105 in the scenario 1. Details are not described herein again.

Step 506: The remote PE updates an SRv6 tunnel list based on the SRv6 VPN SID.

Specifically, in this embodiment, the remote PE receives the routing message from the PE, and updates the SRv6 tunnel list. Specifically, the remote PE extracts the VNF address information carried in the received routing message, and retrieves an SRv6 tunnel policy that corresponds to the VNF and that is from the SRv6 tunnel list. If the SRv6 tunnel policy corresponding to the VNF exists, the remote PE detects, based on the SRv6 VPN SID carried in the routing message, whether a forwarding path of a PE corresponding to the SRv6 VPN SID exists on the remote PE. A specific detection procedure is as follows: the routing message that carries the address information (202.1.1.1) of the VNF and the SRv6 VPN SID2 (B1::1:2/128) and that is sent by the PE2 is used as an example, and the remote PE detects, based on the address information of the VNF, that a corresponding SRv6 policy exists in the SRv6 policy. Then, based on a locator (B1::1/64) in the SRv6 VPN SID2, the remote PE detects whether the SRv6 policy includes an SID-LIST corresponding to the PE2, that is, including a forwarding path of an SRv6 VPN SID with the locator of B1::1/64. In this embodiment, the established SRv6 policy in scenario 1 is used as an example. If the remote PE detects that SRv6 VPN SIDs included in the SID-LIST corresponding to the PE2 are respectively B1::1:2/128 and B1::1:3/128 in the SRv6 policy, the remote PE deletes B1::1:2/128 and B1::1:3/128 and adds B1::1:2/128 to the SRv6 policy to update the SRv6 policy. For the routing message sent by the PE1, the remote PE also updates information in an SRv6 policy corresponding to the routing message. For the routing message sent by the PE3, because no SID-LIST corresponding to the PE3 exists in the SRv6 policy, the remote PE may add the SRv6 VPN SID4 to the SRv6 policy after matching the SRv6 VPN SID4 with a corresponding forwarding path. In other words, the updated SRv6 policy includes three SID-LISTs. Each SID-LIST includes the SRv6 VPN SID1 (A::1:1/128), the SRv6 VPN SID2 (B1::1:2/128), and the SRv6 VPN SID4 (C1::1:4/128). The remote PE can perceive a change on the VNF side in a timely manner and update a corresponding tunnel by updating the SRv6 policy.

Then, a data transmission process of the remote PE is the same as that in the scenario 1, and details are not described herein again.

In conclusion, in this embodiment of this application, the remote PE can perceive a status change of the VNF in a timely manner, and correspondingly update the SRv6 policy to establish the corresponding SRv6 tunnel.

Scenario 4

Specifically, with reference to FIG. 1, in this scenario, an ASBR1 and an ASBR2 (the the ASBR1 and the ASBR2 are the border device in this embodiment of this application) can also enable an SRv6 function. In other words, an SRv6 tunnel may be established between the ASBR and the PE, and an SRv6 tunnel can be established between the ASBR and the remote PE. In addition, the ASBR can function as a connection point between two tunnels to concatenate the two SRv6 tunnels, so that end-to-end communication between the remote PE and the PE is implemented.

Figure 10:
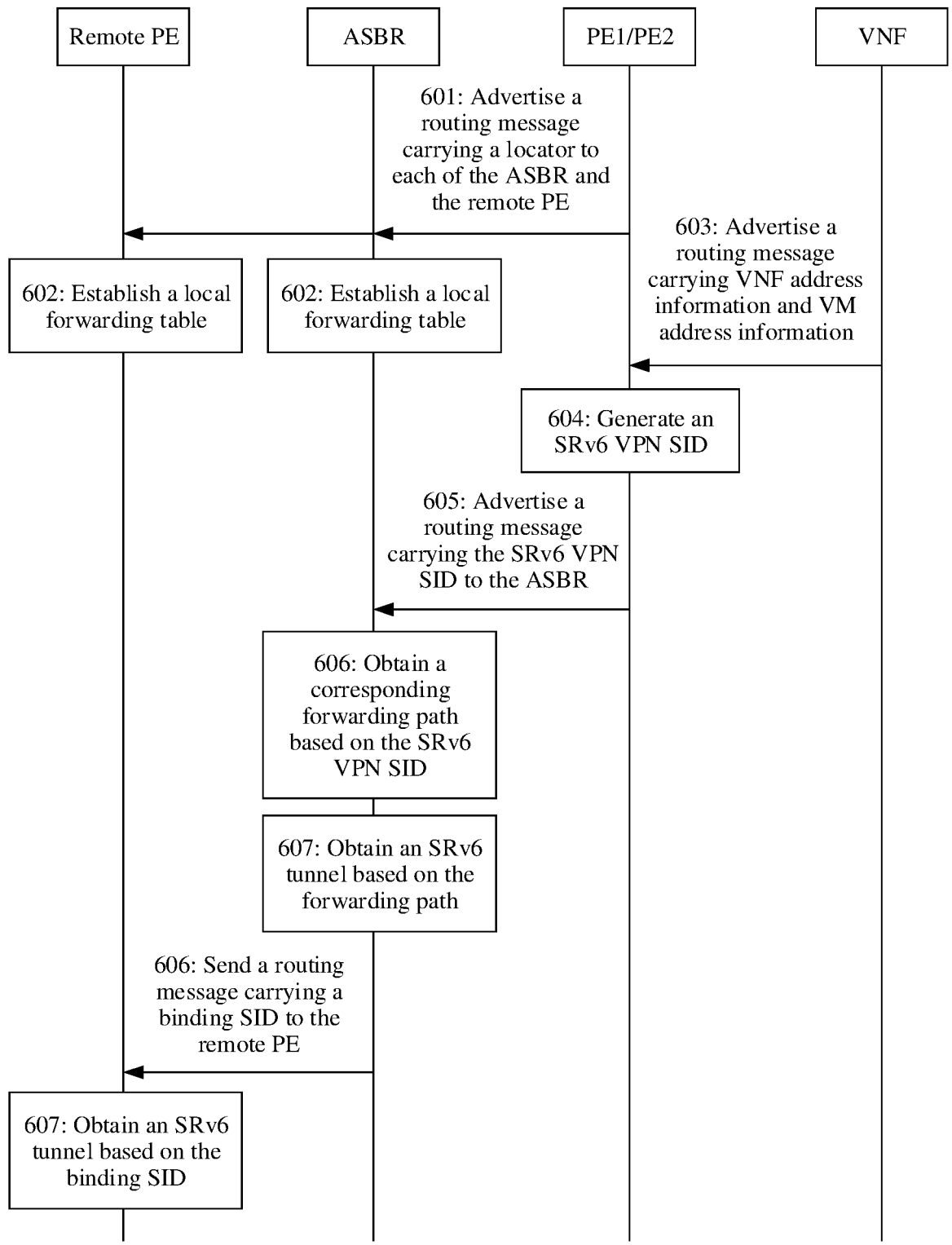
FIG. 10 is a first schematic flowchart of a data transmission method according to an embodiment of this application.

With reference to FIG. 1, FIG. 10 is one of schematic flowcharts of a data transmission method according to an embodiment of this application. In FIG. 10, the method includes the following steps.

In this embodiment, that an external interface address of the VM1 is 1.1.1.1, an external interface address of the VM2 is 1.1.1.2, an interface address of the VM3 is 1.1.1.3, a locator of the PE1 is A1::1/64, a locator of the PE2 is B1::1/64, and address information of the VNF is 202.1.1.1 is used as an example for detailed description.

Step 601: The PE advertises a routing message carrying the locator to each of the ASBR and the remote PE.

Step 602: Each of the ASBR and the remote PE establishes a local forwarding table.

For a process for the ASBR (the ASBR1 and the ASBR2) to establish the forwarding table is the same as that for the remote PE, refer to step 101 and step 102 in the scenario 1. Details are not described herein again.

Step 603: The VNF advertises a routing message carrying VNF address information and VM address information.

For specific step details, refer to step 103 in the scenario 1. Details are not described herein again.

Step 604: The PE generates an SRv6 VPN SID.

For specific details of this step, refer to step 104 in the scenario 1. Details are not described herein again.

Step 605: The PE advertises a routing message carrying the SRv6 VPN SID to the ASBR.

For specific details of this step, refer to step 10 in the scenario 1. Details are not described herein again. It should be noted that, different from step 105, the PE advertises the routing message to the ASBR rather than the remote PE.

Step 606: The ASBR obtains a corresponding forwarding path based on the SRv6 VPN SID.

Step 607: The ASBR obtains an SRv6 tunnel based on the forwarding path.

Specifically, in this embodiment, the PE sends a BGP routing message to the ASBR, where the routing message carries the address information of the VNF and the SRv6 VPN SID. The ASBR obtains the forwarding path corresponding to the SRv6 VPN SID, and adds the forwarding path including the SRv6 VPN SID to a generated SRv6 tunnel policy. Specifically, a process for the ASBR to establish the SRv6 policy is the same as that for the remote PE to establish the SRv6 policy in the scenario 1.

It should be noted that both the ASBR1 and the ASBR2 can receive routing information from the PE1 and the PE2. Therefore, each of the SRv6 policies of the ASBR1 and the ASBR2 include an SRv6 VPN SID1 (A1::1:1/128), an SRv6 VPN SID2 (B1::1:2/128), and an SRv6 VPN SID3 (B1::1:3/128). In other words, the ASBR1 can establish SRv6 tunnels between the ASBR1 and the PE1 and between the ASBR1 and the PE2, and the ASBR2 can establish SRv6 tunnels between the ASBR2 and the PE1 and between the ASBR2 and the PE2.

Then, the ASBR1 generates a binding SID1 (C1::1:1/128) and associates the binding SID1 with an SRv6 policy corresponding to 202.1.1.1. A specific association method is as follows: The ASBR1 correspondingly writes the binding SID1, the address information (202.1.1.1) of the VNF, and type information of the binding SID1 into a local SID list, so that when receiving a routing message carrying the binding SID1, the ASBR1 searches for the local SID list, to obtain association information corresponding to the binding SID1, and finds a corresponding SRv6 policy based on VNF address information in the association information. The type information of the binding SID1 is End.BS6. End.BS6 is used to indicate the ASBR1 to update a binding SID in an outer header of a data packet to the SRv6 VPN SID in the SRv6 policy when the ASBR1 receives the data packet carrying the binding SID1.

Step 608: The ASBR sends a routing message carrying the binding SID to the remote PE.

Then, the ASBR1 advertises a routing message carrying the binding SID1 and the address information (202.1.1.1) of the VNF to the remote PE. A procedure on the ASBR2 is the same as that on the ASBR1. The ASBR2 advertises a routing message carrying a binding SID2 (D1::1:1/128) and the address information (202.1.1.1) of the VNF to the remote PE.

Step 609: The remote PE obtains an SRv6 tunnel based on the binding SID.

Specifically, in this embodiment of this application, the remote PE generates a corresponding SRv6 policy based on the binding SID. A process for the remote PE to generate the SRv6 policy is the same as step 103 in the scenario 1 and is not described herein. Specifically, the SRv6 policy corresponding to 202.1.1.1 generated by the remote PE includes: the binding SID1 (C1::1:1/128) and the binding SID2 (D1::1:1/128), so as to establish SRv6 tunnels between the remote PE and the ASBR1 and between the remote PE and the ASBR2.

Figure 11:
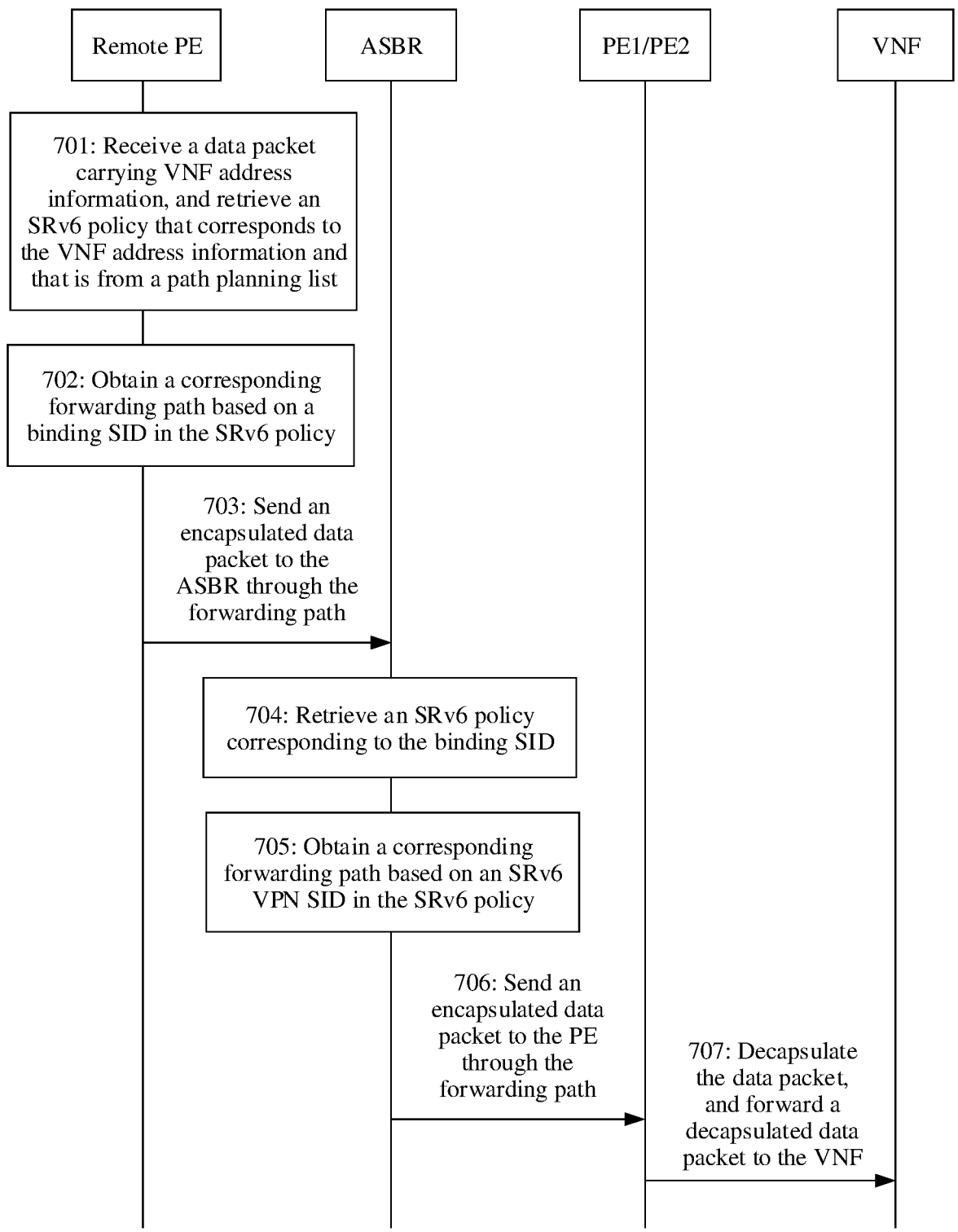
FIG. 11 is a first schematic flowchart of a data transmission method according to an embodiment of this application.

FIG. 11 is one of schematic flowcharts of a data transmission method according to an embodiment of this application. In FIG. 11, the method includes the following steps.

Step 701: A remote PE receives a data packet carrying VNF address information, and retrieves an SRv6 policy that corresponds to the VNF address information and that is from an SRv6 tunnel list.

For specific details of this step, refer to step 201 in the scenario 1. Details are not described herein again.

Step 702: The remote PE obtains a corresponding forwarding path based on a binding SID in the SRv6 policy.

For specific details of this step, refer to step 202 in the scenario 1. Details are not described herein again. Different from step 202, information obtained by the remote PE from the SRv6 policy is the binding SID.

Step 703: The remote PE sends an encapsulated data packet to an ASBR through the forwarding path.

Specifically, in this embodiment of this application, the remote PE sends the data packet to an ASBR1 and an ASBR2 by using a plurality of corresponding forwarding paths in SRv6 tunnels between the remote PE and the ASBR1 and between the remote PE and the ASBR2. Specific details are similar to step 203 in scenario 1, and details are not described herein again. An outermost header of the data packet sent by the remote PE to the ASBR1 includes a binding SID1 (C1::1:1/128) of the ASBR1, and an outermost header of the data packet sent by the remote PE to the ASBR2 includes a binding SID2 (D::1:1/128) of the ASBR2.

Step 704: The ASBR retrieves an SRv6 policy corresponding to the binding SID.

Step 705: The ASBR obtains a corresponding forwarding path based on an SRv6 VPN SID in the SRv6 policy.

Step 706: The ASBR sends an encapsulated data packet to a PE through the forwarding path.

Specifically, in this embodiment of this application, the ASBR1 is used as an example. The ASBR1 receives the data packet that is sent by the remote PE and that carries the binding SID1 (C1::1:1/128). Then, the ASBR1 matches the binding SID1 (C1::1:1/128) with entries in a local SID list one by one, and extracts association information corresponding to a successfully matched binding SID. The association information includes type information (End.BS6) of the binding SID1 and the address information (202.1.1.1) of the VNF, and finds a corresponding SRv6 policy based on 202.1.1.1. Then, the ASBR1 obtains the forwarding path corresponding to the SRv6 VPN SID in the SRv6 policy.

Then, same as the scenario 1, ASBR1 may perform load sharing on the data packet based on obtained three forwarding paths, that is, separately send the data packet to a PE1 and a PE2 through the three forwarding paths.

Specifically, based on the End.BS6 type, the ASBR1 replaces the binding SID1 (C1::1:1/128) included in the outermost header of the data packet sent to the forwarding path corresponding to the SRv6 VPN SID1 (A1::1:1/128) with the SRv6 VPN SID1 (A1::1:1/128) in the SRv6 policy. Then, the ASBR1 sends the encapsulated data packet to the PE1 through the forwarding path between ASBR1 and the PE1. The ASBR1 processes a data packet sent to a forwarding path corresponding to an SRv6 VPN SID2 and a data packet sent to a forwarding path corresponding to an SRv6 VPN SID3 in a same way. The ASBR2 processes the data packet in the same way as that of the ASBR1.

Step 707: The PE decapsulates the data packet, and forwards a decapsulated data packet to a VNF.

Specific details of this step are the same as step 204 in the scenario 1, and details are not described herein again.

In this embodiment, the VNF may set a corresponding weight value for a VM based on a load status of the VM, and then advertise the set weight value to the ASBR by using a routing message, so that when establishing the SRv6 policy, the ASBR adds the SRv6 VPN SID and the corresponding weight to the SRv6 policy to implement unequal cost load balancing on the ASBR side. The detailed procedure is similar to that in the scenario 2, and is not described herein.

In addition, in this embodiment, if a status of any VM in the VNF is updated (the status update includes VM deletion, VM migration, VM interface update, VM addition, and the like), the SRv6 policy on the ASBR side is correspondingly updated. For a specific update process, refer to steps in the scenario 3. Details are not described herein. Different from the scenario 3, the SRv6 policy on the ASBR side can be updated based on the status update on the VNF side. The remote PE side does not perceive a change on the VNF side and therefore does not change the SRv6 policy on the remote PE side. This reduces information exchange and reduces pressure on the device, to improve resource utilization.

In conclusion, in this embodiment of this application, devices at different layers in the metropolitan area network and the DCN network can enable an SRv6 function, so that a more flexible network configuration solution is implemented, network management is more convenient and quicker, and an upper-layer (namely, the remote PE) device does not perceive the change in the cloud network. This reduces the pressure on the device, and effectively improves the resource utilization.

The foregoing mainly describes the solutions provided in the embodiments of this application from a perspective of interaction between network elements. It may be understood that, to implement the foregoing functions, the first device and the border device include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the first device and the border device based on the foregoing method embodiment. For example, each functional module may be divided based on each function, or two or more functions may be integrated in one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 12:
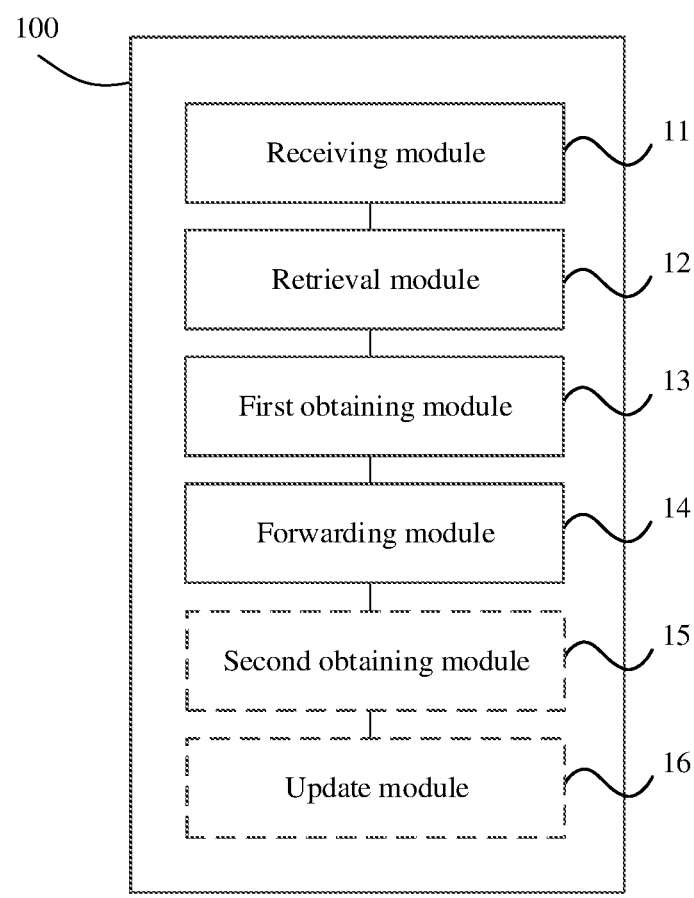
FIG. 12 is one of schematic structural diagrams of a first device according to an embodiment of this application.

When each function module is obtained through division based on each corresponding function, and each function module is obtained through division based on each corresponding function, FIG. 12 is a possible schematic structural diagram of the first device 100 in the foregoing embodiment. As shown in FIG. 12, the first device 100 may include a receiving module 11, a retrieval module 12, a first obtaining module 13, and a forwarding module 14. The receiving module 11 may be configured to receive a data packet, and extract first address information of the data packet, where the first address information is used to indicate a VNF. For example, the receiving module 11 may be configured to support the first device in performing S201 and S401 in the foregoing method embodiments. The retrieval module 12 may be configured to retrieve, based on the first address information, an SRv6 tunnel policy that corresponds to the first address information and that is from an SRv6 tunnel list, where the SRv6 tunnel policy includes a first SRv6 VPN SID. For example, the retrieval module 12 may be configured to support the first device in performing S201 and S401 in the foregoing method embodiments. The first obtaining module 13 may be configured to obtain a forwarding path corresponding to the first SRv6 VPN SID, where the forwarding path is used as a data transmission path when the first device communicates with a second device corresponding to the first SRv6 VPN SID. For example, the obtaining module 13 may be configured to support the first device in performing S202 and S402 in the foregoing method embodiments. The forwarding module 14 may be configured to forward the data packet to the VNF based on the forwarding path by using the second device. For example, the forwarding module 14 may be configured to support the first device in performing S203 and S403 in the foregoing method embodiments. In an embodiment, the first device 100 may further include a second obtaining module 15. The module is configured to establish the SRv6 tunnel. For example, the second obtaining module 15 may be configured to support the first device in performing S105 and S305 in the foregoing method embodiments. The first device 100 may further include an update module 16. The module is configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information. For example, the update module 16 may be configured to support the first device in performing S505 in the foregoing method embodiment.

Figure 13:
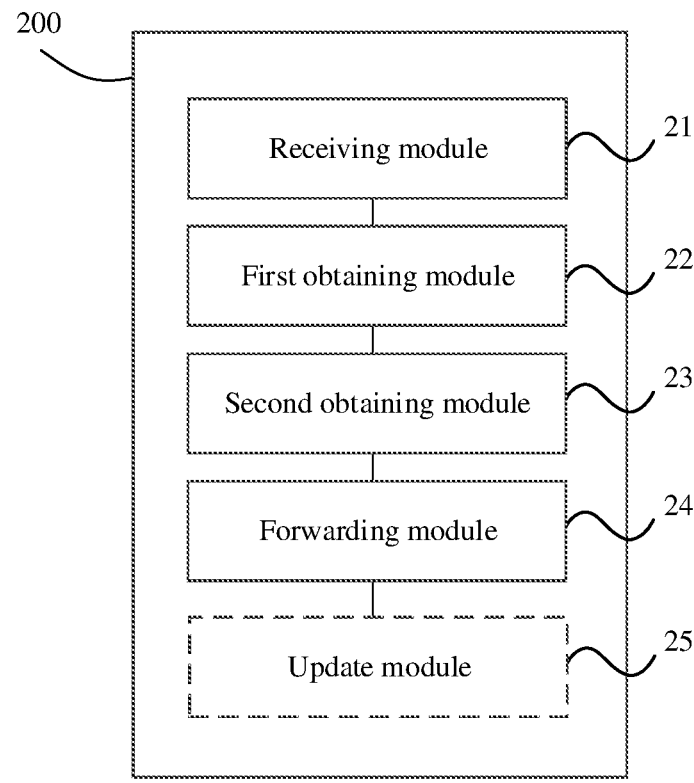
FIG. 13 is one of schematic structural diagrams of a first device according to an embodiment of this application.

FIG. 13 is a possible schematic structural diagram of a first device 200 in the foregoing embodiment. As shown in FIG. 13, the first device 200 may include a receiving module 21, a first obtaining module 22, a second obtaining module 23, and a forwarding module 24. The receiving module 21 may be configured to receive a first routing message sent by a second device, where the first routing message carries a first SRv6 VPN SID and first address information, the first SRv6 VPN SID is generated by the second device based on a second routing message that is sent by a VM and that carries second address information, the first address information is used to indicate a VNF, and the second address information is used to indicate the VM. For example, the receiving module 21 may be configured to support the first device in performing S106 and S306 in the foregoing method embodiments. The first obtaining module 22 may be configured to obtain a forwarding path corresponding to the first SRv6 VPN SID, where the forwarding path is used to indicate a data transmission path when the first device communicates with the second device. For example, the first obtaining module 22 may be configured to support the first device in performing S106 and S306 in the foregoing method embodiments. The second obtaining module 23 may be configured to obtain an SRv6 tunnel based on the forwarding path. For example, the second obtaining module 23 may be configured to support the first device in performing S107 and S307 in the foregoing method embodiments. The forwarding module 24 may be configured to: if the first device receives a data packet carrying the first address information, forward the data packet to the VNF based on the SRv6 tunnel by using the second device. For example, the forwarding module 24 may be configured to support the first device in performing S203 and S403 in the foregoing method embodiments. In a possible implementation, the first device 200 may further include an update module 25. The module may be configured to: if a new SRv6 VPN SID sent by a third device located in the second network is received, add the new SRv6 VPN SID to the SRv6 tunnel policy, where the new SRv6 VPN SID is generated by the third device based on a received third routing message that is advertised by the VNF and that carries third address information of the first VM after the first VM is switched to the third device, and the third address information is the same as or different from the second address information. For example, the update module 25 may be configured to support the first device in performing S505 in the foregoing method embodiment.

Figure 14:
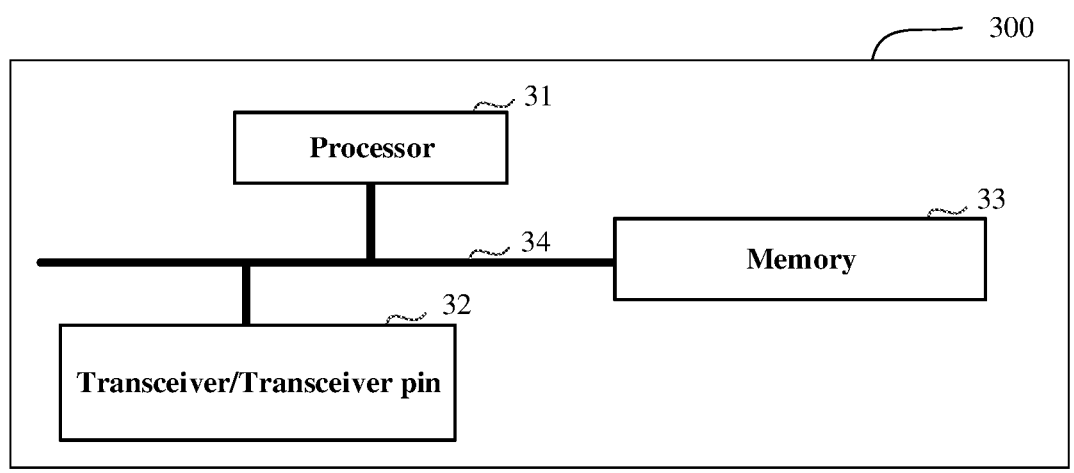
FIG. 14 is a schematic block diagram of a first device according to an embodiment of this application.

In another example, FIG. 14 is a schematic block diagram of another first device 300 according to an embodiment of this application. The first device may include a processor 31 and a transceiver/transceiver pin 32. Optionally, the first device further includes a memory 33. The processor 31 may be configured to perform the steps performed by the first device in the methods in the foregoing embodiments, control a receive pin to receive a signal, and control a transmit pin to send a signal.

Components of the first device 300 are coupled together by using a bus 34. In addition to a data bus, the bus system 34 further includes a power bus, a control bus, and a status signal bus. However, for clear description, various types of buses in the figure are marked as the bus system 34.

Optionally, the memory 33 may be configured to store an instruction in the foregoing method embodiments.

It should be understood that the first device 300 in this embodiment of this application may correspond to the first device in the methods of the foregoing embodiments, and the foregoing and other management operations and/or functions of the components in the first device 300 are intended to implement corresponding steps in the foregoing methods. For brevity, details are not described herein again.

Figure 15:
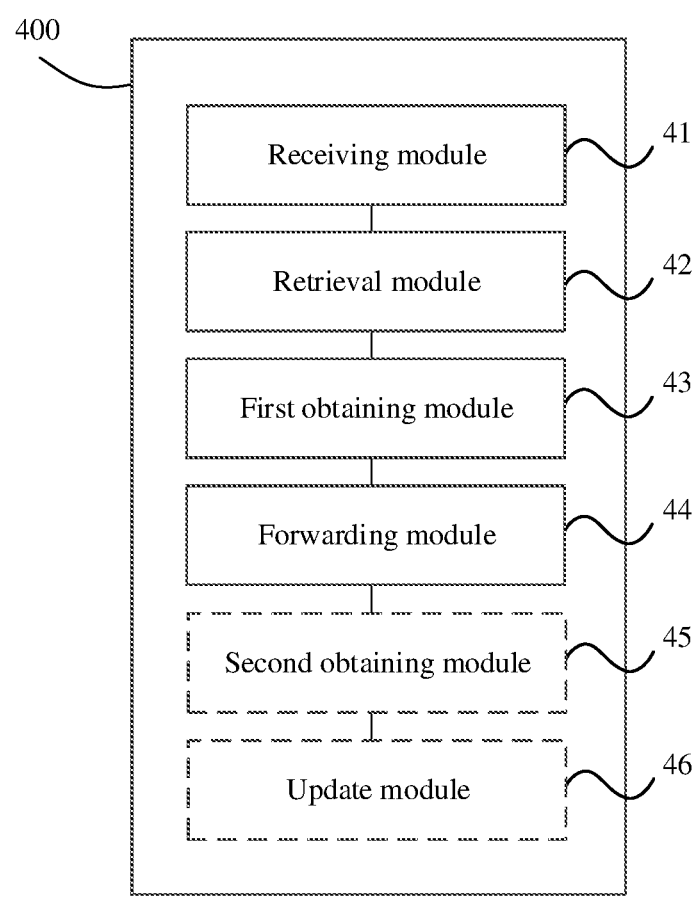
FIG. 15 is one of schematic structural diagrams of a border device according to an embodiment of this application.

FIG. 15 is a possible schematic structural diagram of a border device 400 in the foregoing embodiment. As shown in FIG. 15, the border device 400 may include: a receiving module 41, a retrieval module 42, a first obtaining module 43, and a forwarding module 44. The receiving module 41 may be configured to receive a data packet sent by a first device through a first SRv6 tunnel, where the first SRv6 tunnel is used to establish a communication connection between the first device and the border device, and the data packet carries a first SRv6 VPN SID. For example, the receiving module 41 may be configured to support the border device in performing S704 in the foregoing method embodiment. The retrieval module 42 may be configured to retrieve, based on the first SRv6 VPN SID, an SRv6 tunnel policy that corresponds to the first SRv6 VPN SID and that is from an SRv6 tunnel list, where and the SRv6 tunnel policy includes a second SRv6 VPN SID. For example, the retrieval module 42 may be configured to support the border device in performing S704 in the foregoing method embodiment. The obtaining module 43 may be configured to obtain a forwarding path corresponding to the second SRv6 VPN SID, where the forwarding path is used as a data transmission path when the border device communicates with the second device. For example, the obtaining module 43 may be configured to support the border device in performing S705 in the foregoing method embodiment. The forwarding module 44 may be configured to forward the data packet to the VNF based on the forwarding path by using the second device. For example, the forwarding module 44 may be configured to support the border device in performing S706 in the foregoing method embodiment. In an embodiment, the border device 400 may further include a second obtaining module 45. The module is configured to obtain the SRv6 tunnel. For example, the second obtaining module 45 may be configured to support the border device in performing S605 in the foregoing method embodiment. In another embodiment, the border device 400 may further include an update module 46, configured to: if a second SRv6 VPN SID sent by a third device is received, detect whether an SRv6 VPN SID including third address information exists in an SRv6 tunnel policy, where the third address information is used to indicate an SRv6 address of the third device, and the third device is located in a second network. If a detection result is yes, the border device 400 updates, based on the second SRv6 VPN SID, the SRv6 VPN SID including the third address information.

Figure 16:
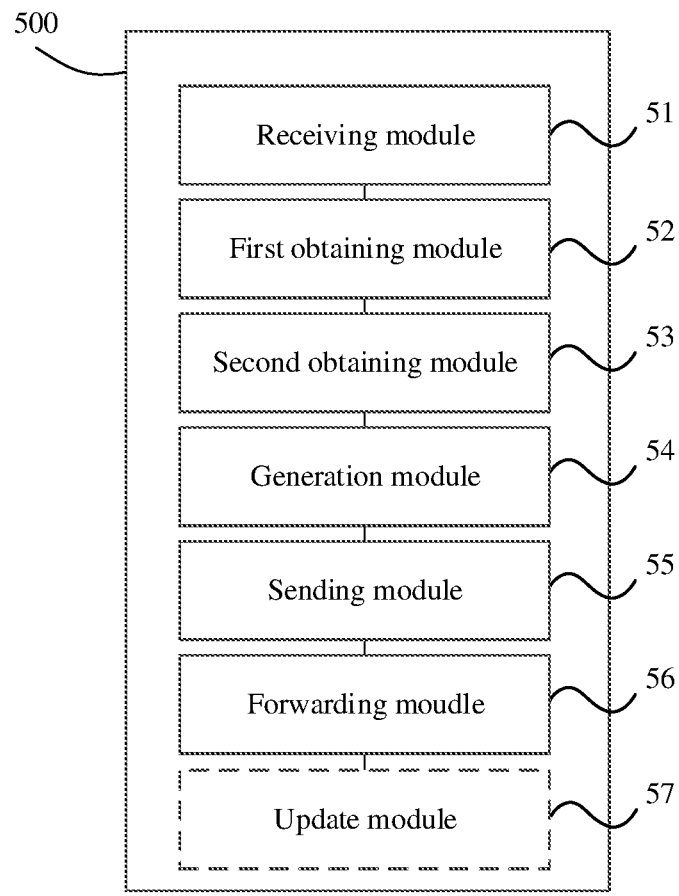
FIG. 16 is one of schematic structural diagrams of a border device according to an embodiment of this application.

FIG. 16 is a possible schematic structural diagram of a border device 500 in the foregoing embodiment. As shown in FIG. 16, the border device 500 may include: a receiving module 51, a first obtaining module 52, a second obtaining module 53, a generation module 54, a sending module 55, and a forwarding module 56. The receiving module 51 may be configured to receive a first routing message sent by a second device, where the first routing message carries a first SRv6 VPN SID and first address information, the first SRv6 VPN SID is generated by the second device based on a second routing message that is sent by a VM and that carries second address information, the first address information is used to indicate the VNF, and the second address information is used to indicate the first VM. For example, the receiving module 51 may be configured to support the border device in performing S605 in the foregoing method embodiment. The first obtaining module 52 may be configured to obtain a forwarding path corresponding to the first SRv6 VPN SID, where the forwarding path is used to indicate a data transmission path when the second device communicates with the border device. For example, the first obtaining module 52 may be configured to support the border device in performing S603 in the foregoing method embodiment. The second obtaining module 53 may be configured to obtain a first SRv6 tunnel based on the forwarding path. For example, the second obtaining module 53 may be configured to support the border device in performing S605 in the foregoing method embodiment. The generation module 54 may be configured to generate a second SRv6 VPN SID, and associate the second SRv6 VPN SID with the first SRv6 tunnel. For example, the generation module 54 may be configured to support the border device in performing S605 in the foregoing method embodiment. The sending module 55 may be configured to send the second SRv6 VPN SID to the first device, and the first device obtains a second SRv6 tunnel between the first device and the border device based on the second SRv6 VPN SID. For example, the sending module 55 may be configured to support the border device in performing S606 in the foregoing method embodiment. The forwarding module 56 may be configured to: if a data packet that is sent by the first device and that carries the second SRv6 VPN SID is received, forward the data packet to the VNF based on the second SRv6 tunnel by using a third device. For example, the forwarding module 56 may be configured to support the border device in performing S706 in the foregoing method embodiment. In another embodiment, the border device 500 may further include an update module 57, configured to: if a new SRv6 VPN SID sent by a third device located in a second network is received, detect whether an SRv6 VPN SID including third address information exists in an SRv6 tunnel policy, where the third address information is used to indicate an SRv6 address of the third device, and the new SRv6 VPN SID is generated by the third device based on a received third routing message that is advertised by a VNF and that carries second address information of a first VM after the first VM is switched to the third device. If the SRv6 VPN SID including the third address information exists, the border device 500 updates the SRv6 VPN SID including the third address information based on the new SRv6 VPN SID.

Figure 17:
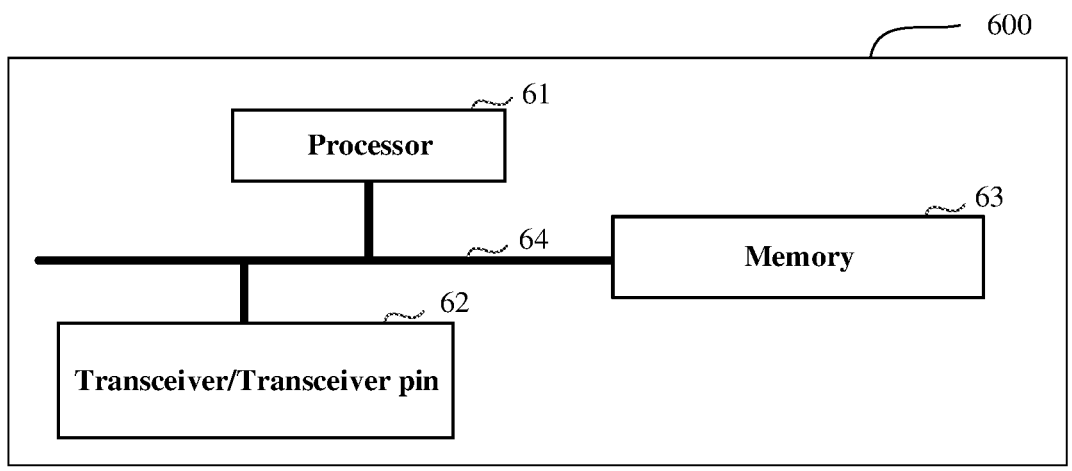
FIG. 17 is a schematic block diagram of a border device according to an embodiment of this application.

In another example, FIG. 17 is a schematic block diagram of another border device 600 according to an embodiment of this application. The border device 600 may include a processor 61 and a transceiver/transceiver pin 62. Optionally, the border device further includes a memory 63. The processor 61 may be configured to perform the steps performed by the border device in the methods in the foregoing embodiments, control a receive pin to receive a signal, and control a transmit pin to send a signal.

Components of the border device 600 are coupled together by using a bus 64, where in addition to a data bus, the bus system 64 includes a power bus, a control bus, and a status signal bus. However, for clear description, various types of buses in the figure are marked as the bus system 64.

Optionally, the memory 63 may be configured to store an instruction in the foregoing method embodiments.

It should be understood that the border device 600 in this embodiment of this application may correspond to the first device in the methods of the foregoing embodiments, and the foregoing and other management operations and/or functions of the components in the border device 600 are intended to implement corresponding steps in the foregoing methods. For brevity, details are not described herein again.

All related content of the steps in the foregoing method embodiments may be cited in function descriptions of corresponding function modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by a first device and/or a border device, so as to control the first device and/or the border device to implement the foregoing method embodiments.

Based on a same technical concept, an embodiment of this application further provides a computer program. When the computer program is executed by a first device and/or a border device, the computer program is used to implement the foregoing method embodiments.

The program may be completely or partially stored in a storage medium that is encapsulated with a processor, or may be completely or partially stored in a memory that is not encapsulated with a processor.

Based on a same technical concept, an embodiment of this application further provides a processor. The processor is configured to implement the foregoing method embodiments. The processor may be a chip.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (Random Access Memory, RAM for short), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in network equipment. Certainly, the processor and the storage medium may exist in network equipment as discrete components.

A person skilled in the art should be aware that in the foregoing one or more examples, functions described in the embodiments of this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A method, comprising:
receiving, by a first device, a data packet, and extracting first address information of the data packet, wherein the first address information indicates a virtualized network function (VNF), a communications system comprises the first device, a second device, and the VNF, the VNF implements a plurality of virtual machines (VMs), the first device is located in a first network, the second device is located in a second network, and the plurality of VMs communicate with the first device using the second device;
retrieving, by the first device based on the first address information, an internet protocol 6 (IPV6) segment routing (SRv6) tunnel policy that corresponds to the first address information and that is from an IPv6 SRv6 tunnel list, wherein the IPv6 SRv6 tunnel policy indicates an SRv6 tunnel between the first device and the second device, and the IPv6 SRv6 tunnel policy comprises a first SRv6 virtual private network segment identifier (VPN SID);
obtaining, by the first device, a forwarding path corresponding to the first SRv6 VPN SID, wherein the forwarding path is used as a data transmission path when the first device communicates with a second device corresponding to the first SRv6 VPN SID; and
forwarding, by the first device, the data packet to the VNF based on the forwarding path using the second device.

2. The method according to claim 1, wherein the first network is a metropolitan area network and the second network is a data center network (DCN).

3. The method according to claim 1, further comprising:
receiving, by the first device, a first routing message sent by the second device, wherein the first routing message carries the first SRv6 VPN SID and the first address information, the first SRv6 VPN SID is generated by the second device based on a second routing message that is advertised by the VNF and that carries second address information, and the second address information indicates a first VM in the plurality of VMs;
detecting, by the first device, whether the IPv6 SRv6 tunnel policy corresponding to the first address information exists in the SRv6 tunnel list; and
performing the following:
in response to detecting that the IPv6 SRv6 tunnel policy corresponding to the first address information exists in the SRV6 tunnel list, adding the first SRv6 VPN SID to the IPv6 SRv6 tunnel policy; or
in response to detecting that no IPv6 SRv6 tunnel policy corresponding to the first address information exists in the SRV6 tunnel list, generating the IPv6 SRv6 tunnel policy, associating the IPv6 SRv6 tunnel policy with the first address information, and adding the first SRv6 VPN SID to the IPv6 SRv6 tunnel policy.

4. The method according to claim 3, further comprising:
in response to receiving a new SRv6 VPN SID sent by a third device located in the second network, adding the new SRv6 VPN SID to the IPv6 SRv6 tunnel policy, wherein the new SRv6 VPN SID is generated by the third device based on a received third routing message that is advertised by the VNF and that carries third address information of the first VM after the first VM is switched to the third device, and the third address information is the same as or different from the second address information.

5. The method according to claim 3, further comprising:
in response to detecting that the IPv6 SRv6 tunnel policy corresponding to the first address information exists in the SRV6 tunnel list, performing the following:
detecting, by the first device, whether the forwarding path corresponding to the first SRv6 VPN SID exists in a local forwarding table; and
in response to detecting that the forwarding path corresponding to the SRv6 VPN SID exists in the local forwarding table, adding the forwarding path comprising the first SRv6 VPN SID to the IPv6 SRv6 tunnel policy, or in response to detecting that no forwarding path corresponding to the SRv6 VPN SID exists in the local forwarding table, obtaining the forwarding path from a controller side, and adding the forwarding path comprising the first SRv6 VPN SID to the IPv6 SRv6 tunnel policy; or in response to detecting that the IPv6 SRv6 tunnel policy corresponding to the first address information exists in the SRV6 tunnel list, performing the following:
generating, by the first device, the IPv6 SRv6 tunnel policy, and associating the IPv6 SRv6 tunnel policy with the first address information;
detecting, by the first device, whether the forwarding path corresponding to the first SRv6 VPN SID exists in a local forwarding table; and
in response to detecting that the forwarding path corresponding to the first SRv6 VPN SID exists in the local forwarding table, adding the forwarding path comprising the first SRv6 VPN SID to the IPv6 SRv6 tunnel policy, or in response to detecting that no forwarding path corresponding to the first SRv6 VPN SID exists in the local forwarding table, obtaining the forwarding path from a controller side, and adding the forwarding path comprising the first SRv6 VPN SID to the IPv6 SRv6 tunnel policy.

6. The method according to claim 1, wherein the IPv6 SRv6 tunnel policy further comprises a weight value corresponding to the first SRv6 VPN SID, and the weight value indicates that the first device allocates, based on the weight value, the data packet to the forwarding path corresponding to the first SRv6 VPN SID.

7. A method, comprising:
receiving, by a border device, a data packet sent by a first device through a first internet protocol 6 (IPV6) segment routing (SRv6) tunnel, wherein the first IPv6 SRv6 tunnel is used to establish a communication connection between the first device and the border device, and the data packet carries a first SRv6 segment identifier (SID), and a communications system comprises the first device, the border device, a second device, and a virtualized network function (VNF), the VNF implements a plurality of virtual machines (VMs), the first device is located in a first network, the second device is located in a second network, the border device is a border node between the first network and the second network, and the plurality of VMs communicate with the first device using the second device;
retrieving, by the border device based on the first SRv6 VPN SID, an SRv6 tunnel policy that corresponds to the first SRv6 VPN SID and that is from an SRv6 tunnel list, wherein the SRv6 tunnel policy indicates a second SRv6 tunnel between the border device and the second device, and the SRv6 tunnel policy comprises a second SRv6 VPN SID;
obtaining, by the border device, a forwarding path corresponding to the second SRv6 VPN SID, wherein the forwarding path is used as a data transmission path when the border device communicates with the second device; and
forwarding, by the border device, the data packet to the VNF based on the forwarding path using the second device.

8. The method according to claim 7, wherein the first network is a metropolitan area network and the second network is a data center network (DCN).

9. The method according to claim 7, further comprising:
receiving a first routing message sent by the second device, wherein the first routing message carries the second SRv6 VPN SID and first address information, the second SRv6 VPN SID is generated by the second device based on a second routing message that is advertised by the VNF and that carries second address information, and the second address information indicates a first VM implemented by the VNF;
detecting, by the border device, whether an SRv6 tunnel policy corresponding to the first address information exists; and
in response to detecting that the SRv6 tunnel policy corresponding to the first address information exists, adding the second SRv6 VPN SID to the SRv6 tunnel policy; or
in response to detecting that no SRv6 tunnel policy corresponding to the first address information exists, generating the SRv6 tunnel policy, associating the SRv6 tunnel policy with the first address information, and adding the second SRv6 VPN SID to the SRv6 tunnel policy.

10. The method according to claim 9, further comprising:
in response to receiving a new SRv6 VPN SID sent by a third device located in the second network, adding the new SRv6 VPN SID to the SRv6 tunnel policy, wherein the new SRv6 VPN SID is generated by the third device based on a received third routing message that is advertised by the VNF and that carries third address information of a second VM after the second VM is switched to the third device, and the third address information is the same as or different from the second address information.

11. The method according to claim 9, further comprising:
in response to detecting that the SRv6 tunnel policy corresponding to the first address information exists, detecting, by the border device, whether the forwarding path corresponding to the second SRv6 VPN SID exists in a local forwarding table, and performing the following:
  in response to detecting that the forwarding path corresponding to the second SRv6 VPN SID exists, adding the forwarding path comprising the second SRv6 VPN SID to the SRv6 tunnel policy; or
  in response to detecting that no forwarding path corresponding to the second SRv6 VPN SID exists, obtaining the forwarding path from a controller side, and adding the forwarding path comprising the second SRv6 VPN SID to the SRv6 tunnel policy; or
in response to detecting that the SRv6 tunnel policy corresponding to the first address information does not exist, generating, by the border device, the SRv6 tunnel policy, associating the SRv6 tunnel policy with the first address information, detecting whether the forwarding path corresponding to the second SRv6 VPN SID exists in a local forwarding table, and performing the following:
  in response to detecting that the forwarding path corresponding to the second SRv6 VPN SID exists, adding the forwarding path comprising the second SRv6 VPN SID to the SRv6 tunnel policy; or
  in response to detecting that no forwarding path corresponding to the second SRv6 VPN SID exists, obtaining the forwarding path from a controller side, and adding the forwarding path comprising the second SRv6 VPN SID to the SRv6 tunnel policy.

12. The method according to claim 7, wherein the SRv6 tunnel policy further comprises a weight value corresponding to the second SRv6 VPN SID, and the weight value indicates that the border device allocates, based on the weight value, the data packet to the forwarding path corresponding to the second SRv6 VPN SID.

13. A first device, comprising:
a non-transitory memory storing a program; and
a processor communicatively connected to the non-transitory memory, wherein the program is executable by the processor, and the program includes instructions for:
  receiving a data packet, and extracting first address information of the data packet, wherein the first address information indicates a virtualized network function (VNF), a communications system comprises a first device, a border device, a second device, and the VNF, the VNF implements a plurality of virtual machines (VMs), the first device is located in a first network, the second device is located in a second network, the border device is a border node between the first network and the second network, and the plurality of VMs communicate with the first device by using the second device;
  retrieving, based on the first address information, an SRv6 tunnel policy that corresponds to the first address information and that is from an internet protocol 6 (IPV6) segment routing (SRv6) tunnel list, wherein the SRv6 tunnel policy indicates an SRv6 tunnel between the first device and the second device, and the SRv6 tunnel policy comprises a first SRv6 virtual private network segment identifier (VPN SID);
  obtaining a forwarding path corresponding to the first SRv6 VPN SID, wherein the forwarding path is used as a data transmission path when the first device communicates with a second device corresponding to the first SRv6 VPN SID; and
  forwarding the data packet to the VNF based on the forwarding path using the second device.

14. The first device according to claim 13, wherein the first network is a metropolitan area network and the second network is a data center network (DCN).

15. The first device according to claim 13, wherein the program further includes instructions for:
  receiving a first routing message sent by the second device, wherein the first routing message carries the first SRv6 VPN SID and the first address information, the first SRv6 VPN SID is generated by the second device based on a second routing message that is advertised by the VNF and that carries second address information, and the second address information is used to indicate a first VM in the plurality of VMs;
  detecting whether the SRv6 tunnel policy corresponding to the first address information exists in the SRv6 tunnel list; and
  in response to detecting that the SRv6 tunnel policy corresponding to the first address information exists in the SRv6 tunnel list, adding the first SRv6 VPN SID to the SRv6 tunnel policy; or
  in response to detecting that no SRv6 tunnel policy corresponding to the first address information exists in the SRv6 tunnel list, generating the SRv6 tunnel policy, associating the SRv6 tunnel policy with the first address information, and adding the first SRv6 VPN SID to the SRv6 tunnel policy.

16. The first device according to claim 15, wherein the program further includes instructions for:
  in response to receiving a new SRv6 VPN SID sent by a third device located in the second network, adding the new SRv6 VPN SID to the SRv6 tunnel policy, wherein the new SRv6 VPN SID is generated by the third device based on a received third routing message that is advertised by the VNF and that carries third address information of the first VM after the first VM is switched to the third device, and the third address information is the same as or different from the second address information.

17. A border device, comprising:

a non-transitory memory storing a program; and a processor that is communicatively connected to the non-transitory memory, wherein the program is executable by the processor, and the program includes instructions for:

receiving a data packet sent by a first device through a first internet protocol 6 (IPV6) segment routing (SRv6) tunnel, wherein the first IPv6 SRv6 tunnel is used to establish a communication connection between the first device and the border device, and the data packet carries a first SRv6 segment identifier (SID), a communications system comprises the first device, a second device, and a virtualized network function (VNF), the VNF implements a plurality of virtual machines (VMs), the first device is located in a first network, the second device is located in a second network, the border device is a border node between the first network and the second network, and the plurality of VMs communicate with the first device by using the second device;

retrieving, based on the first SRv6 VPN SID, an SRv6 tunnel policy that corresponds to the first SRv6 VPN SID and that is from an SRv6 tunnel list, wherein the SRv6 tunnel policy indicates a second SRv6 tunnel between the border device and the second device, and the SRv6 tunnel policy comprises a second SRv6 VPN SID;

obtaining a forwarding path corresponding to the second SRv6 VPN SID, wherein the forwarding path is used as a data transmission path when the border device communicates with the second device; and forwarding the data packet to the VNF based on the forwarding path by using the second device.

18. The border device according to claim 17, wherein the first network is a metropolitan area network and the second network is a data center network (DCN).

19. The border device according to claim 17, wherein the program further includes instructions for:

receiving a first routing message sent by the second device, wherein the first routing message carries the second SRv6 VPN SID and first address information, the second SRv6 VPN SID is generated by the second device based on a second routing message that is advertised by the VNF and that carries second address information, and the second address information indicates a VM in the VNF;

detecting whether an SRv6 tunnel policy corresponding to the first address information exists; and in response to detecting that the SRv6 tunnel policy corresponding to the first address information exists, adding the second SRv6 VPN SID to the SRv6 tunnel policy; or in response to detecting that no SRv6 tunnel policy corresponding to the first address information exists, generating the SRv6 tunnel policy, associating the SRv6 tunnel policy with the first address information, and adding the second SRv6 VPN SID to the SRv6 tunnel policy.

20. The border device according to claim 17, wherein the SRv6 tunnel policy further comprises a weight value corresponding to the second SRv6 VPN SID, and the weight value is indicates that the processor allocates, based on the weight value, the data packet to the forwarding path corresponding to the second SRv6 VPN SID.

* * * * *